United States Patent
Bachmann et al.

(10) Patent No.: US 9,307,442 B2
(45) Date of Patent: Apr. 5, 2016

(54) HEADER SIZE REDUCTION OF DATA PACKETS

(75) Inventors: Jens Bachmann, Langen (DE); Kilian Weniger, Langen (DE); Genadi Velev, Langen (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1465 days.

(21) Appl. No.: 12/664,874

(22) PCT Filed: Jun. 13, 2008

(86) PCT No.: PCT/EP2008/004776
§ 371 (c)(1),
(2), (4) Date: Jan. 28, 2010

(87) PCT Pub. No.: WO2009/015727
PCT Pub. Date: Feb. 5, 2009

(65) Prior Publication Data
US 2010/0189103 A1    Jul. 29, 2010

(30) Foreign Application Priority Data
Jun. 19, 2007    (EP) .................................... 07011971

(51) Int. Cl.
| | |
|---|---|
| *H04L 29/06* | (2006.01) |
| *H04W 28/06* | (2009.01) |
| *H04L 29/12* | (2006.01) |
| *H04W 80/04* | (2009.01) |

(52) U.S. Cl.
CPC .............. *H04W 28/06* (2013.01); *H04L 69/04* (2013.01); *H04L 29/12216* (2013.01); *H04L 61/2007* (2013.01); *H04L 61/6059* (2013.01); *H04W 80/04* (2013.01)

(58) Field of Classification Search
None
See application file for complete search history.

(56) References Cited

U.S. PATENT DOCUMENTS

| | | | | |
|---|---|---|---|---|
| 6,115,394 | A * | 9/2000 | Balachandran et al. | 370/477 |
| 6,987,762 | B2 * | 1/2006 | Shiota | 370/389 |
| 7,058,728 | B1 * | 6/2006 | Eklund | 370/477 |
| 7,215,667 | B1 | 5/2007 | Davis | |
| 7,386,881 | B2 * | 6/2008 | Swander et al. | 370/475 |
| 7,400,627 | B2 * | 7/2008 | Wu et al. | 370/392 |
| 7,613,188 | B1 * | 11/2009 | French et al. | 370/392 |

(Continued)

OTHER PUBLICATIONS

International Search Report dated Nov. 18, 2008.

(Continued)

*Primary Examiner* — Timothy J Weidner
(74) *Attorney, Agent, or Firm* — Dickinson Wright PLLC

(57) ABSTRACT

The invention relates to a method for reducing the header size of data packets by removing inner headers from the data packets, wherein at least an outer header remains for routing purposes. When removing the inner headers from a data packet, a newly configured address of the receiving and/or the transmitting entity is inserted in the remaining outer header of the data packet. Context information is provided in the receiving entities for reconstructing the removed inner headers, wherein the context information is referred to by the newly configured address that is in the source and/or destination address of the outer header. The reduced data packet is transmitted with only one header, thereby significantly reducing the size of each data packet. The original packet is completely reconstructed at the receiving entity thereby allowing to proceed with the usual processing of each data packet.

18 Claims, 15 Drawing Sheets

(56) References Cited

U.S. PATENT DOCUMENTS

Figure 1:
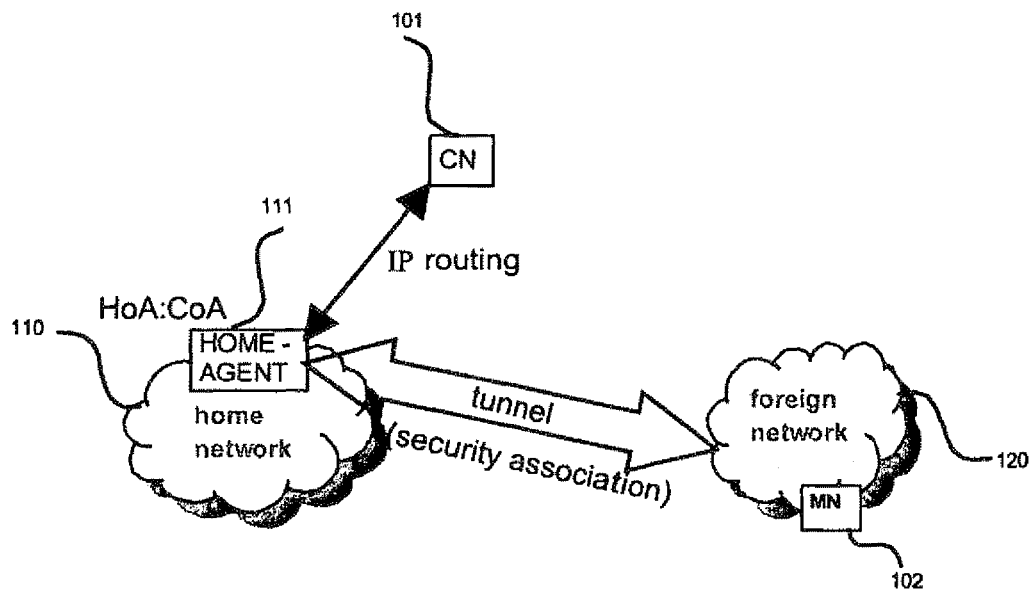

| | | | |
|---|---|---|---|
| 2002/0174203 A1 | 11/2002 | Kuhn | |
| 2004/0001508 A1 | 1/2004 | Zheng | |
| 2005/0265363 A1* | 12/2005 | Chen | 370/401 |
| 2005/0271033 A1* | 12/2005 | Nakash | 370/349 |
| 2005/0281259 A1* | 12/2005 | Mitchell | 370/389 |
| 2006/0268820 A1 | 11/2006 | Mahkonen | |
| 2008/0089339 A1* | 4/2008 | Tsirtsis et al. | 370/392 |
| 2008/0101366 A1* | 5/2008 | Venkitaraman et al. | 370/392 |
| 2008/0181147 A1* | 7/2008 | Rydnell et al. | 370/310 |
| 2008/0310344 A1* | 12/2008 | Krishnan et al. | 370/328 |

OTHER PUBLICATIONS

D. Johnson, "Mobility Support in IPv6," Network Working Group, Request for Comments: 3775, Rice University, Category: Standards Track, Jun. 2004, pp. 1-165, p. 3, line 24.

\* cited by examiner

- context-ID is encoded into the UDP destination/source port

- context-ID is encoded into the destination/source address

HEADER SIZE REDUCTION OF DATA PACKETS

FIELD OF THE INVENTION

The invention relates to a method for reducing the header size of data packets on a particular communication path. The invention mainly applies to communication between a MN and a CN, wherein intermediate nodes apply additional encapsulation of data packets, thereby increasing the data traffic. In particular, the invention provides different method steps so as to encode in the transmitting entity the inner headers of the data packets into an address of the outer header, and later in the receiving entity, restore the inner headers from previously generated context information which is identified by the address in the outer header. Furthermore, the invention relates to a network entity and a mobile node, that participate in the invention.

TECHNICAL BACKGROUND

Communications systems evolve more and more towards an Internet Protocol (IP)-based network. They typically consist of many interconnected networks, in which speech and data is transmitted from one terminal to another terminal in pieces, so-called packets. IP packets are routed to the destination by routers in a connection-less manner. Therefore, packets comprise IP header and payload information, whereby the header comprises among other things source and destination IP address.

For scalability reasons, an IP network uses a hierarchical addressing scheme. Hence, an IP address does not only identify the corresponding terminal, but additionally contains location information about this terminal. With additional information provided by routing protocols, routers in the network are able to identify the next router towards a specific destination.

In particular, a process referred to as routing is used to move data packets from a source to a destination over at least one intermediate network. In order for the data packet to reach the destination, the data packet needs to be handed off from one router to another, until it gets to the physical network of the destination device. This is also referred to as next-hop routing, since the routing is based on a step-by-step basis, that is, the exact path between the source and the destination is not known at the beginning, but each intermediate router knows the next-hop router to which to forward the data packet. The main advantage achieved by this is that each router only needs to know which neighboring router should be the next recipient for a given data packet, rather than knowing all the routers on the path to every destination network.

Exemplary, after the source device sends a packet to its local router, the data link layer of the local router passes it up to the router's IP layer. Correspondingly, after removing the layer 2 frame, the layer 3 header of the packet is examined, and the router decides to which next router the packet is to be sent. Consequently, the packet is re-encapsulated in an appropriate layer 2 frame and is passed back down to the data link layer, which sends it over one of the router's physical network links to the determined next router.

In this respect, a router maintains a set of information, called routing table, that provides a mapping between different network IDs (IP address prefixes) and the other routers to which it is connected. Correspondingly, the router checks the destination IP address of a data packet against the routing table entries to determine the next-hop router, based on the longest match of the destination address with an entry of the routing table. In addition, a metric value defined for each routing table entry allows to rate, based on certain criteria, particular routing entries, and thus to select the best path among several possible paths.

The routing tables are thus relevant for an efficient provision of data and may be configured manually by an operator, or dynamically. A manual setting of static routes is only feasible for smaller networks, whereas in the common Internet, which changes constantly, mainly dynamic routing tables are applied. The automatic construction of routing tables is managed and updated by routing protocols, involving a series of periodic or on-demand messages containing routing information that is exchanged between routers.

The network layer 3 (OSI) is the layer where the routing of packets actually takes place, wherein the layer 3 header of a data packet is not changed while routed through intermediate networks. As higher layers of a source and a destination are only "logically" connected, that is, there is no real/physical connectivity, it is necessary for the packets to traverse the lower layers 2 and 1 to get physically delivered to the destination. Since different protocols may be used in each layer 2, each data packet passed from e.g. layer 3 to layer 2 has to be appropriately framed.

Accordingly, encapsulation of data packets is usually used to transmit data from an upper layer protocol via a lower layer protocol. For instance, IPv4 and IPv6 protocol are network layer protocols, and the User Data Protocol (UDP) or the Transmission Control Protocol (TCP) are transport layer protocols. Consequently, user data is encapsulated in a UDP datagram (layer 4), which is then encapsulated in an IP packet (layer 3). Sequentially, the IP packet, along with the encapsulated user data, may then be transmitted over the data link layer protocol (e.g. Ethernet, layer 2), which again entails an encapsulation.

Furthermore, encapsulation may also be used within a same layer in case one protocol of a particular layer is used for transporting a data packet encapsulated by another protocol of the same particular layer. A logical construct called a tunnel is established between the device that encapsulates and the device that decapsulates, wherein the process itself is referred to as tunneling. The tunneling may be used for transmitting data packets of one network protocol through a network (controlled by a different protocol) which would otherwise not support it. Tunneling may also be used to provide various types of Virtual Private Network (VPN) functionalities such as private addressing and security or for mobility support. For instance, there is the GPRS Tunnelling Protocol (GTP), the Point-to-Point Tunneling Protocol (PPTP) or the IP security Protocol (IPsec).

One of the most commonly used tunneling mechanisms is the IP (layer 3)-in-IP (layer 3) encapsulation, which refers to the process of encapsulating an IP-datagram with another IP header and may be used e.g. for Mobile IP. Mobile IPv6—also denoted MIPv6—(see D. Johnson, C. Perkins, J. Arkko, "Mobility Support in IPv6", IETF RFC 3775, Jun. 2004, incorporated herein by reference) is an IP-based mobility protocol that enables mobile nodes to move between subnets in a manner transparent for higher layers and applications, i.e. without breaking higher-layer connections. In other words, the mobile nodes remain reachable while moving around in the IPv6 internet network.

Usually, when a terminal powers on, it configures an IP address that is based on the IP address prefix of the access network. If a terminal is mobile, a so-called mobile node (MN), and moves between subnets with different IP prefix addresses, it must change its IP address to a topological correct address due to the hierarchical addressing scheme.

However, since connections on higher-layers such as TCP connections are defined with the IP addresses (and ports) of the communicating nodes, the connection to the active IP sessions breaks if one of the nodes changes its IP address, e.g. due to movement. One possible protocol to address said problem is the MIPv6 protocol.

The main principle of MIPv6 is that a mobile node is always identified by its Home Address (HoA), regardless of its topological location in the Internet, while a Care-of Address (CoA) of the mobile node provides information about the current topological location of the mobile node.

In more detail, a mobile node (mainly referred to as MN or User Equipment UE) has two IP addresses configured: a Care-of Address and a Home Address. The mobile node's higher layers use the Home Address for communication with the communication partner (destination terminal), from now on mainly called Correspondent Node (CN). This address does not change and serves the purpose of identifying the mobile node. Topologically, it belongs to the Home Network (HN) of the mobile node. In contrast, the Care-of Address changes on every movement resulting in a subnet change and is used as the locator for the routing infrastructure. Topologically, it belongs to the network the mobile node is currently visiting. One out of a set of Home Agents (HA) located on the home link maintains a mapping of the mobile node's Care-of Address to the mobile node's Home Address and redirects incoming traffic for the mobile node to its current location. Reasons for deploying a set of home agents instead of a single home agent may be e.g. redundancy and load balancing.

Figure 2:
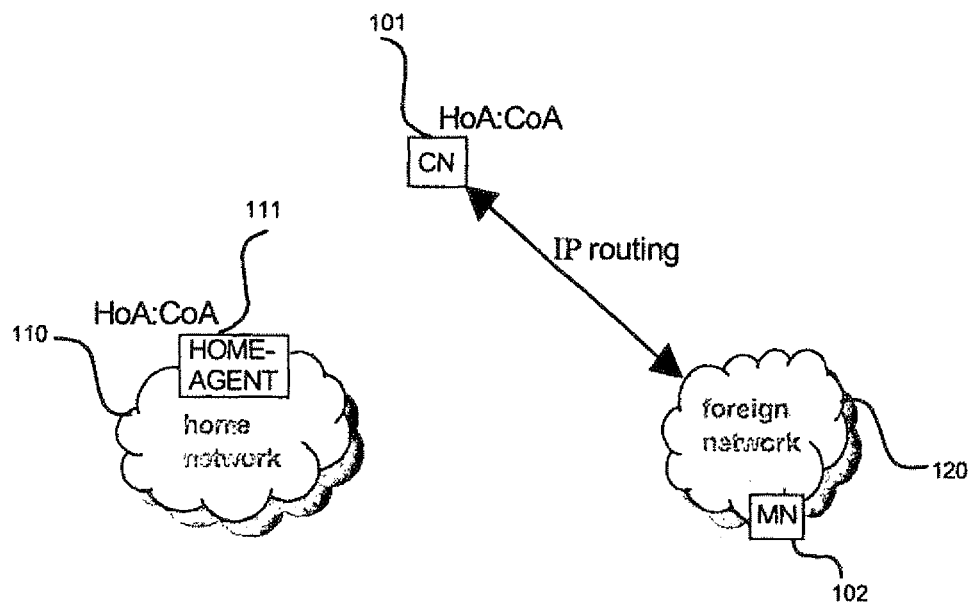

Mobile IPv6 currently defines two modes of operation, one of which is bi-directional tunneling (FIG. 1). The other mode is the route optimization mode (FIG. 2). In using bi-directional tunneling, data packets sent by the correspondent node 101 and addressed to the home address of the mobile node 102 are intercepted by the home agent 111 in the home network 110. IP-in-IP encapsulation is required because each data packet that is intercepted needs to be resent over the network to the Care-of Address of the MN 102. Accordingly, each intercepted data packet is included as the payload in a new IP data packet addressed to the CoA of the MN 102 and tunneled to the MN 102, which is located at the foreign network 120. The start of the corresponding tunnel is the Home Agent 111, which does the encapsulation and the end is the mobile node 102. It might also be possible that a local agent in the foreign network 120 receives messages on behalf of the mobile node, strips off the outer IP header and delivers the decapsulated data packet to the mobile node (not shown).

Data packets sent by the mobile node 102 are reverse tunneled to the home agent 111, which decapsulates the packets and sends them to the correspondent node 101. Reverse tunneling means that packets are tunneled by the mobile node to the home agent in a "reverse" manner to the "forward" tunnel.

Regarding this operation, in MIPv6 only the Home Agent 111 is informed about the Care-of Address of the mobile node 102. Therefore, the mobile node sends Binding Update (BU) messages to the Home Agent. These messages are advantageously sent over an iPsec security association, and are thus authenticated and integrity protected.

Generally, IPsec provides security services at the IP layer for other protocols and applications in order for them to communicate securely. That is, IPsec sets up a secure path between two communicating nodes over insecure intermediate systems. In this respect, IPsec is composed of several components to provide security service, wherein the two main ones are the Authentication Header (AH) protocol and the Encapsulating Security Payload (ESP) protocol. They provide authenticity and privacy to IP data by adding particular headers to the IP data packet.

Figure 3:
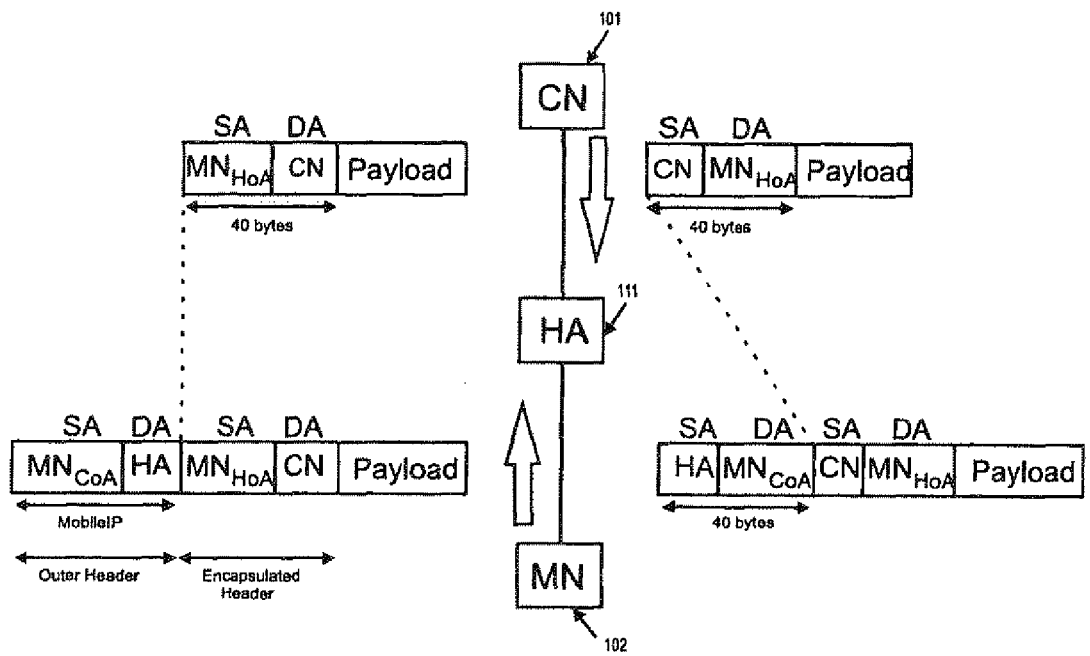

FIG. 3 shows a diagram of an exemplary data packet exchange between a CN 101 and a MN 102 via the Home Agent 111 of the MN 102, wherein the packet format during the communication is illustrated in detail. It is assumed that all communication between the CN and the MN is conducted via the MN's HA 111, that is, no route optimization has been performed. Consequently, the IP header of a data packet transmitted from the CN to the MN contains the Home Address of the MN as destination address, and the IP address of the CN as the source address. In accordance with the destination address of the packet being the Home Address of the MN, the data packet is routed to the Home Network, and then to the Home Agent of the MN.

As explained above, upon receiving the data packet, the HA applies the IP-in-IP encapsulation based on MIPv6 procedures and sends the encapsulated packet to the MN. In other words, the HA tunnels the received data packets to the MN by applying the IP-in-IP encapsulation. More specifically, the HA adds another IP header to the packet, comprising its own address as the source address, and the Care-of Address of the MN as the destination address of the additional header. As apparent from FIG. 3 this augments the packet size with another 40 bytes. For the following discussion and description of the various embodiments of the invention, it should be noted that the IP-in-IP header applied at the HA is mainly called "outer header", whereas the header encapsulated by the outer header will be mostly referred to as "encapsulated header" or "inner header". The outer header and the encapsulated header(s) form a concatenation of headers.

Data packets that are returned by the MN are encapsulated with two IP headers. The outer header is used by routers for routing the packet and relates to the tunneling of the data packet to the HA, and accordingly includes the address of the HA as the destination address, and the Care-of Address of the MN as the source address. The inner IP header includes the CN's address as the destination, and the MN's Home Address as the source address.

Therefore, each data packet of a communication session between a MN and a CN is augmented between the HA and the MN, this resulting in additional traffic in the corresponding network. This is especially disadvantageous in networks with limited data bandwidth capabilities, e.g. wireless networks.

This is only one example in which additional overhead is generated during the transfer of data packets to a receiving entity. Other scenarios may include even more additional header bytes. For instance, in case data security is necessary on a particular path, the IPSec protocol may be used to transmit encrypted data packets on said path, which however adds another 48 bytes. Furthermore, provided that said path is between the HA and the mobile node, this means that each data packet has 88 bytes (40 bytes (IP-in-IP)+48 bytes (IPSec)) of overhead.

SUMMARY OF THE INVENTION

Therefore, in view of the above problems in the state of the art, one object of the invention is to improve the exchange of data packets between two entities in a mobile communications network.

A more specific object of the invention is to reduce the header size of data packets exchanged between the two entities in the mobile communications system.

At least one of the above objects is solved by the subject matter of the independent claims. Advantageous embodiments of the invention are subject-matters of the dependent claims.

Within a tunnel between two endpoints several different flows can be transported. In case of IP flows, each inner flow may have different IP headers, i.e. with different source/destination addresses, traffic classes, flow labels, etc. In order to be able to first remove and later fully reconstruct the inner headers, some information is required to be transported with the data packets to enable the reconstruction of the inner headers at the receiver.

Several proposals to reduce the header overhead, e.g. the Robust Header Compression (ROHC) mechanisms, are based on additional information, that is added to the transported data packets. This adds again some overhead that should be avoided. The header removal mechanism described in this invention does not add additional overhead to a packet and thus may reduce the headers of a tunneled packet to a single header that is the outer one.

According to one aspect of the invention, the data packets on a communication path are reduced by removing part(s) of the inner headers and by then reconstructing the inner header in the receiving entity by means of a context comprising information for reconstructing the inner header. The Context Identifier, by which the Context is identified in the receiving entity, is encoded by the transmitting entity into the source and/or destination address of an outer header of the data packet, from which part(s) of the inner header are removed. Consequently, this does not add any additional overhead, and for the best case only the outer header remains.

One embodiment of the invention provides a method for reducing the size of data packets of a data flow exchanged on a communication path in a mobile communications system between a first entity and a second entity. The data packets on said communication path comprise a concatenation of headers, wherein an outer header in the concatenation of headers is used for exchanging the data packets on the communication path between the first and second entity. A new address is configured, which uniquely identifies a context comprising information for reconstructing the concatenation of headers in the data packets.

An address in a destination or source address field of the outer header is then replaced with the configured new address. At least one part of at least one header other than the outer header is removed from the concatenation of headers, prior to transmitting the data packet to the second entity. Finally, the data packets with the concatenation of headers from which the at least one part of the at least one header has been removed are transmitted from the first entity to the second entity via the communication path using the outer header with the configured new address in the destination or source address field.

According to another embodiment of the invention, the context comprising information for reconstructing the concatenation of headers is exchanged between the first and second entity. Upon configuring the new address, the configured new address is associated with the context comprising information for reconstructing the concatenation of headers.

Relating to an advantageous embodiment of the invention, the first/second entity decides for the downlink and/or uplink direction which at least one part of the at least one headers in the concatenation of headers except for the outer header is to be removed from the data packets and reconstructed. Upon deciding, the second/first entity is informed about which at least one part of the at least one header in the concatenation of headers is to be removed and reconstructed.

In a further embodiment of the invention, the first entity configures the new address. An address in the source address field of the outer header of the data packets, transmitted from the first entity to the second entity is replaced with the configured new address of the first entity. Similarly, an address in the destination address field of the outer header of the data packets, transmitted from the second entity to the first entity, is replaced with the configured new address of the first entity as well. One advantage from using only one new address, is that only one entity (here, the first entity) needs to configure a new address. This is especially advantageous in cases where the network in which the second entity is located cannot configure new addresses e.g. due to a restricted address space.

According to still another embodiment of the invention, the first entity and the second entity each configure one new address. In said case, the source/destination address field in the outer header of the data packets, transmitted from the first entity to the second entity, is replaced with the configured new address of the first/second entity.

Conversely, the source/destination address field in the outer header of the data packets, transmitted from the second entity to the first entity, is replaced with the configured new address of the second/first entity. One possible advantage in case the source address is used, is that there is no need to configure additional IP address on the interface of the receiving entity, since no packets will be destined to said address.

In another embodiment of the invention, the outer header of the data packets includes an original address, composed of a prefix and an interface identifier. The new address is configured by maintaining the prefix of the original address and changing the interface identifier, or by changing the prefix and the interface identifier.

According to a more advantageous embodiment of the invention, within the data flow the at least one part of the at least one header, that is to be removed from the concatenation of headers in the data packets, comprises a field with a value that can vary from one data packet to another data packet. In said cases, the varying value is copied from the at least one header that is to be removed into a field in the outer header, corresponding to the field with the varying value in the at least one part of the at least one header. Thereby, it easily possible to apply the embodiments of the invention, to headers which are not entirely static.

Referring to a different embodiment of the invention, within the data flow the at least one header, that is to be removed from the concatenation of headers in the data packets, comprises a field with a value that can vary from one data packet to another data packet. The rate of variation of the value in the field of the at least one part of the at least one header that is to be removed is determined from one data packet to another data packet. The embodiment of the invention is only conducted in case the rate of variation of the value is below a predetermined value.

In a more advantageous embodiment of the invention, within the data flow the at least one part of the at least one header, that is to be removed from the concatenation of headers in the data packets, comprises a field with a value that can vary from one data packet to another data packet. For each different value among these varying values of said field, a different new address is configured, wherein each of different new address uniquely identifies a different context comprising information for reconstructing the concatenation of headers comprising the different value.

This is advantageous for example since it is possible to reduce the headers of a data packet, to only one outer header in the best case, irrespective of changing fields in the headers that are to be removed.

According to another embodiment of the invention, within the data flow the at least one part of the at least one header, that is to be removed from the concatenation of headers in the data packets, comprises a field with a value that can vary from one data packet to another data packet. It is further assumed that the first entity and the second entity each configure a new address. In such a case, an address in the source/destination address field of the outer header is replaced with the configured new address of the first entity. Furthermore, an address in the destination/source address field of the outer header is replaced with the configured new address of the second entity. The configured new address of the first/second entity uniquely identifies a context for reconstructing the field with the varying value and the configured new address of the second/first entity uniquely identifies a context for reconstructing the concatenation of headers except for the field comprising the varying value. This hybrid approach is advantageous for at least the reason that only one entity possibly needs to allocate a large number of IP address to cope with the changing fields, whereas the other entity gets on with only one new IP address for the static fields of the inner headers to be removed.

Relating to a different embodiment of the invention, the first entity generates a first hash value, which represents the at least one part of the at least one header to be removed from the concatenation of headers. The first hash value results from performing a specific calculation on fields of the at least one part of the at least one header. A message is transmitted from the first entity to the second entity comprising the generated first hash value, the configured new address and information on the fields of the at least one part of the at least one header on which the calculation of the first hash value is performed. The second entity generates a second hash value by performing on each received data packet the specific calculation on the fields of the at least one part of the at least one header, indicated by the received information. The second entity identifies the concatenation of headers of received data packets, that are to be reconstructed and/or from which the at least one part of the at least one header has to be removed, by matching the received first hash value with the second hash value of each received data packet. Further, the second entity associates the received configured new address of the first entity with a context for reconstructing the identified concatenation of headers. Instead of transmitting the complete headers to the second entity, it suffices to only transmit the hash values, which reduces the size of the message.

According to a more advantageous embodiment of the invention, the first entity generates a first hash value, which represents the at least one part of the at least one header to be removed from the concatenation of headers. The first hash value results from performing a specific calculation on fields of the at least one part of the at least one header. A message is transmitted from the first entity to the second entity comprising the generated first hash value and information on the fields of the at least one part of the at least one header on which the calculation of the first hash value is performed. The second entity generates a second hash value by performing on each received data packet the specific calculation on the fields of the at least one part of the at least one header, indicated by the received information. The second entity identifies the concatenation of headers of received data packets, that are to be reconstructed and/or from which the at least one part of the at least one header has to be removed, by matching the received first hash value with the second hash value of each received data packet. The second entity deduces the new address of the first entity by maintaining the subnet prefix compared to an original address of the first entity and using the first hash value as interface identifier of the new address of the first entity. Additionally, the second entity associates the deduced new address of the first entity with a context for reconstructing the identified concatenation of headers. Provided that it is possible for the second entity to configure any interface identifier, the second entity may use the first hash value of the first entity to configure the address. Then, the first entity knows which IP address will be used by the second entity, since the first entity also knows the first hash value. Therefore, there is no need to transmit a message to the first entity to inform it about the new address of the second entity.

One embodiment of the invention provides a method for generating data packets comprising a concatenation of headers from received data packets comprising an incomplete concatenation of headers. The data packets belong to a data flow exchanged on a communication path in a mobile communications system between a first entity and a second entity. A data packet is received comprising an incomplete concatenation of headers but at least an outer header. The outer header in the data packet has been used for the exchange of the data packet on the communication path between the first entity and the second entity. Furthermore, the outer header comprises an address uniquely identifying a context comprising information for reconstructing the complete concatenation of headers. The complete concatenation of headers for the received data packet is reconstructed based on the information in the context identified by the address in the outer header of the received data packet.

According to another embodiment of the invention, the second entity determines whether to reconstruct the complete concatenation of headers. In case it is determined to not reconstruct the complete concatenation of headers, it is determined which part of the complete concatenation of headers is to be reconstructed. Then, the determined part of the complete concatenation of headers is reconstructed based on the information in the context identified by the address in the outer header of the received data packet.

One embodiment of the invention provides an entity for reducing the size of data packets of a data flow on a communication path in a mobile communications system between the entity and a second entity. The data packets on said communication path comprise a concatenation of headers, wherein the outer header in the concatenation of headers is used for exchanging the data packets on the communication path between the entity and the second entity. A processor within the entity configures a new address, which uniquely identifies a context comprising information for a reconstruction of the concatenation of headers in the data packets. The processor replaces an address in a destination or source address field of the outer header with the configured new address. The processor removes at least one part of the at least one header other than the outer header from the concatenation of headers. A transmitter in the entity transmits to the second entity the data packets with the concatenation of headers from which the at least one part of the at least one header other than the outer header has been removed, using the outer header with the configured new address in the destination or source address field.

One embodiment of the invention provides an entity for generating data packets comprising a concatenation of headers from received data packets comprising an incomplete concatenation of headers. The data packets belong to a data flow exchanged on a communication path in a mobile communications system between a first entity and the entity. A receiver within the entity receives a data packet comprising an incomplete concatenation of headers but at least an outer header, having been used for the exchange of the data packet on the communication path between the first entity and the entity. The outer header comprises an address uniquely identifying a context comprising information for reconstructing the complete concatenation of headers. A processor reconstructs the complete concatenation of headers for the received data packet based on the information in the context identified by the address in the outer header of the received data packet.

A further embodiment of the invention provides a method for reducing the size of data packets of a data flow exchanged between a first entity and second entity. The data packets of said data flow comprise a concatenation of headers, including an outer header and a first inner header used for exchanging the data packets between the first and second entity. Furthermore, the first and second entities are located in networks supporting the Internet Protocol Version 4. The outer header of a data packet is adapted to the Internet Protocol Version 4 type. A new port number is configured, uniquely identifying the context comprising information for reconstructing the concatenation of headers in the data packet. A port number in a destination or source field of the first inner header of the concatenation of headers is then replaced with the configured new port number. At least one part of at least one header, other than the outer header and the first inner header, is removed from the concatenation of headers, prior to transmitting the data packet to the second entity. Subsequently, the data packet with the concatenation of headers, from which the at least one part of the at least one header has been removed, is transmitted from the first entity to the second entity using the outer header and the first inner header with the configured new port number.

According to an advantageous embodiment of the invention, the first inner header and the port number in the first inner header belong to the User Datagram Protocol or to the Transmission Control Protocol.

Referring to a further embodiment of the invention, within the data flow the at least one part of the at least one header, that is to be removed from the concatenation of headers in the data packet, comprises a field with a value that can vary from one data packet to another data packet. In said case, the varying value is copied from the at least one part of the at least one header that is to be removed into an appropriate field in the outer header. Alternatively, the field with the varying value is simply not removed. Further alternatively, a new port number is configured for each varying value of the field, respectively uniquely identifying a context comprising information for reconstructing the concatenation of headers in the data packet including the varying value in the field.

In another advantageous embodiment of the invention Network Address Translation, NAT, is used for the second entity, and the data packets are exchanged between the first and second entity via a NAT router. A data packet is transmitted from the second entity via the NAT router to the first entity using the configured new port number in the destination or source field in order to enable in the NAT router the reception and forwarding of data packets from the first entity using the configured new port number.

According to a different embodiment of the invention, Network Address Translation, NAT, is used for the second entity, and the data packets are exchanged between the first and second entity via a NAT router. A configuration message is transmitted from the second entity to the first entity via the NAT router, wherein the configuration message is transmitted from the second entity using a first port number in the source field of the first inner header, and the configuration message is forwarded from the NAT router to the first entity using a second port number in the source field of the first inner header. Then, in the first entity the second port number is determined as the new port number uniquely identifying the context comprising the information for reconstructing the concatenation of headers in the data packet.

In a further embodiment of the invention the configured new port number is hierarchically structured with at least regard to entities with which data packets are exchanged, with regard to the sessions in which at least one data flow exist and with regard to data flows of data packets.

One embodiment of the invention provides a method for generating data packets comprising a concatenation of headers from received data packets comprising an incomplete concatenation of headers. The data packets belong to a data flow exchanged between a first entity and a second entity. A data packet is received comprising an incomplete concatenation of headers but at least an outer header and a first inner header, having been used for the exchange of the data packet between the first entity and the second entity. The first inner header comprises a port number uniquely identifying a context comprising information for reconstructing the complete concatenation of headers. The complete concatenation of headers for the received data packet is then reconstructed based on the information in the context identified by the port number in the first inner header of the received data packet.

One embodiment of the invention provides an entity for reducing the size of data packets of a data flow exchanged between the entity and a second entity. The data packets comprise a concatenation of headers, wherein the outer header and a first inner header in the concatenation of headers are used for exchanging the data packets between the entity and the second entity. The entity and the second entity are located in networks supporting the Internet Protocol Version 4. A processor of the entity adapts the outer header of a data packet to the Internet Protocol Version 4 type. The processor further configures a new port number uniquely identifying a context comprising information for a reconstruction of the concatenation of headers in the data packets. The processor then replaces a port number in a destination or source field of the first inner header with the configured new port number. The processor removes at least one part of the at least one header other than the outer header and the first inner header from the concatenation of headers. A transmitter of the entity transmits to the second entity the data packet with the concatenation of headers from which the at least one part of the at least one header has been removed, using the first inner header with the configured new port number in the destination or source field.

One embodiment of the invention further provides an entity for generating data packets comprising a concatenation of headers from received data packets comprising an incomplete concatenation of headers. The data packets belong to a data flow exchanged between a first entity and the entity. A receiver of the entity receives a data packet comprising an incomplete concatenation of headers but at least an outer header and a first inner header, having been used for the exchange of the data packet between the first entity and the entity. The first inner header comprises a port number uniquely identifying a context comprising information for reconstructing the complete concatenation of headers. Then, a processor of the entity reconstructs the complete concatenation of headers for the received data packet based on the information in the context identified by the port number in the first inner header of the received data packet.

BRIEF DESCRIPTION OF THE FIGURES in the following the invention is described in more detail in reference to the attached figures and drawings. Similar or corresponding details in the figures are marked with the same reference numerals.

Figure 5:
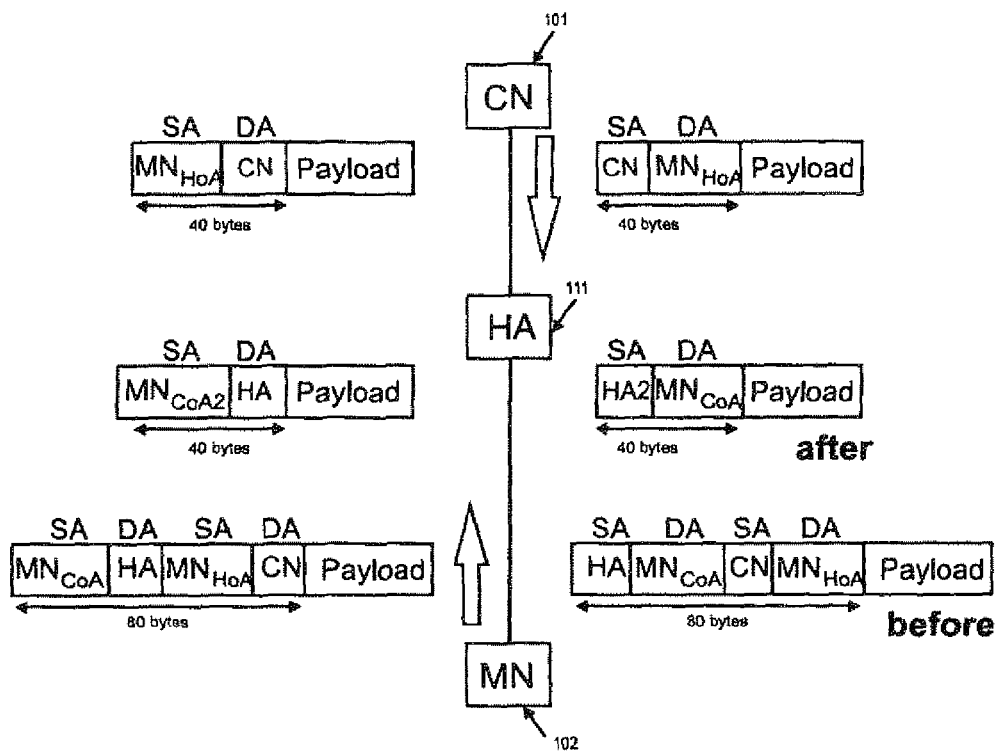
Figure 6:
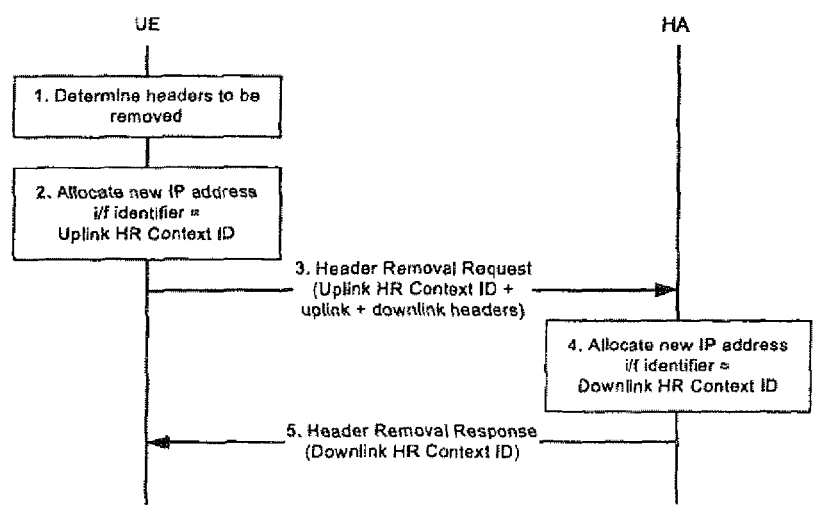
Figure 8:
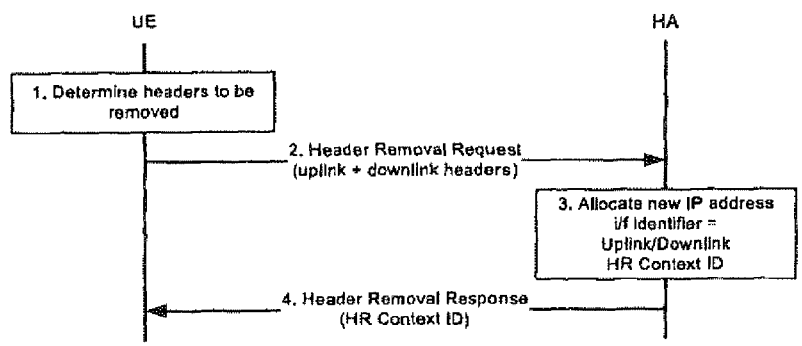
Figure 9:
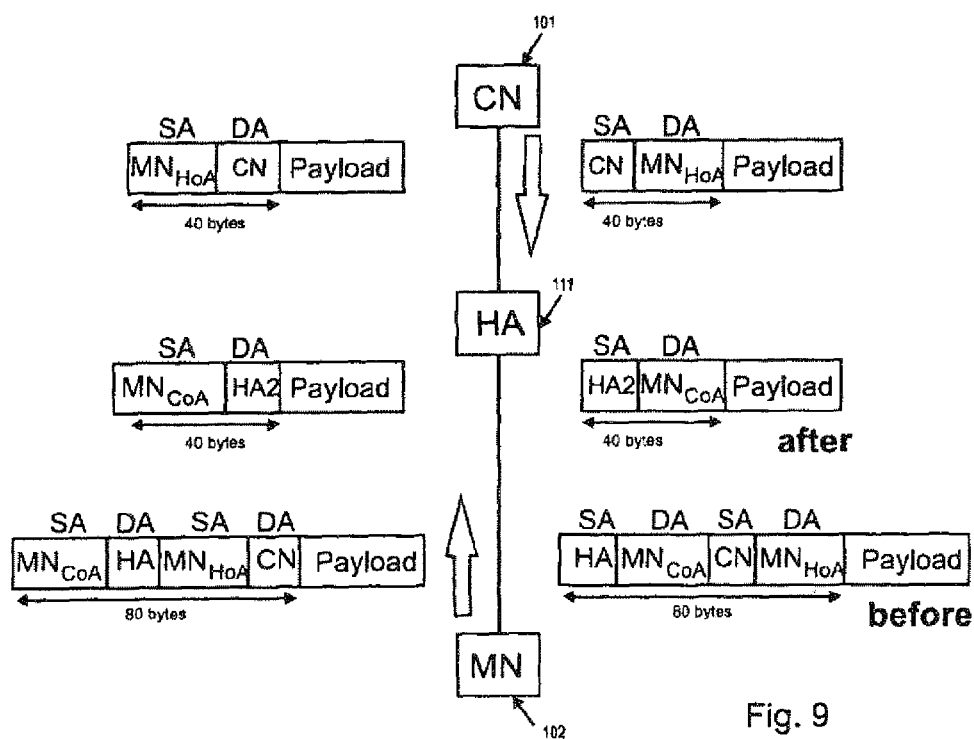
Figure 10:
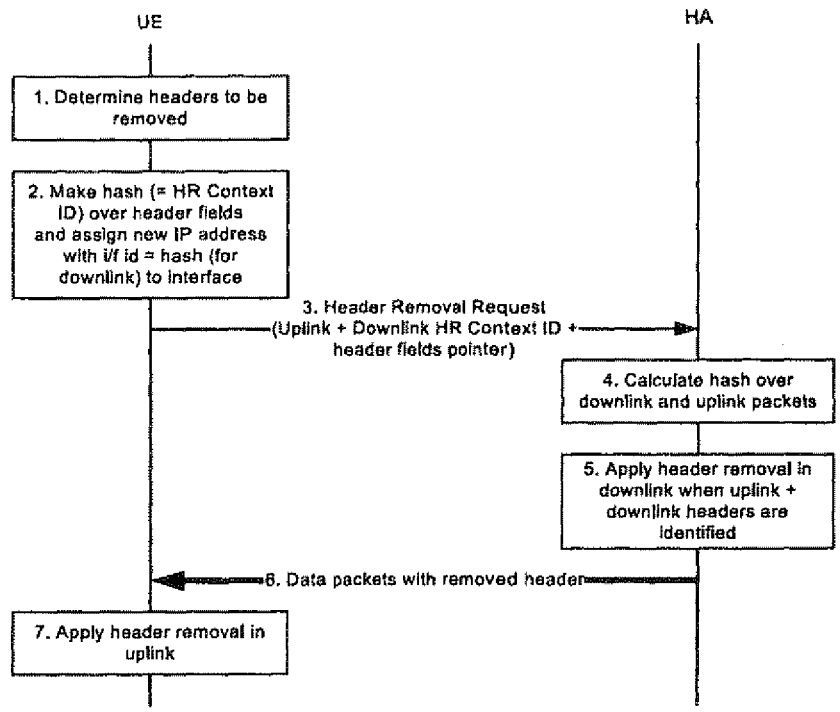
Figure 11:
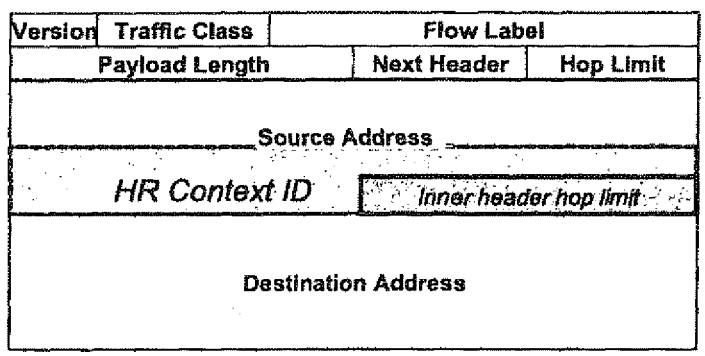
Figure 12:
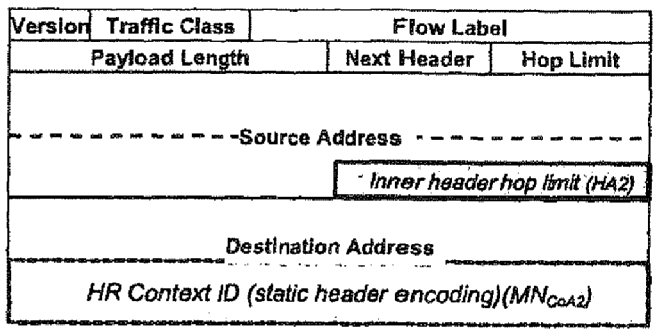
Figure 13:
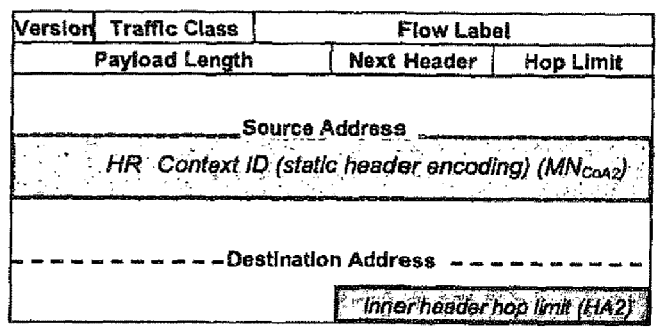
Figure 14:
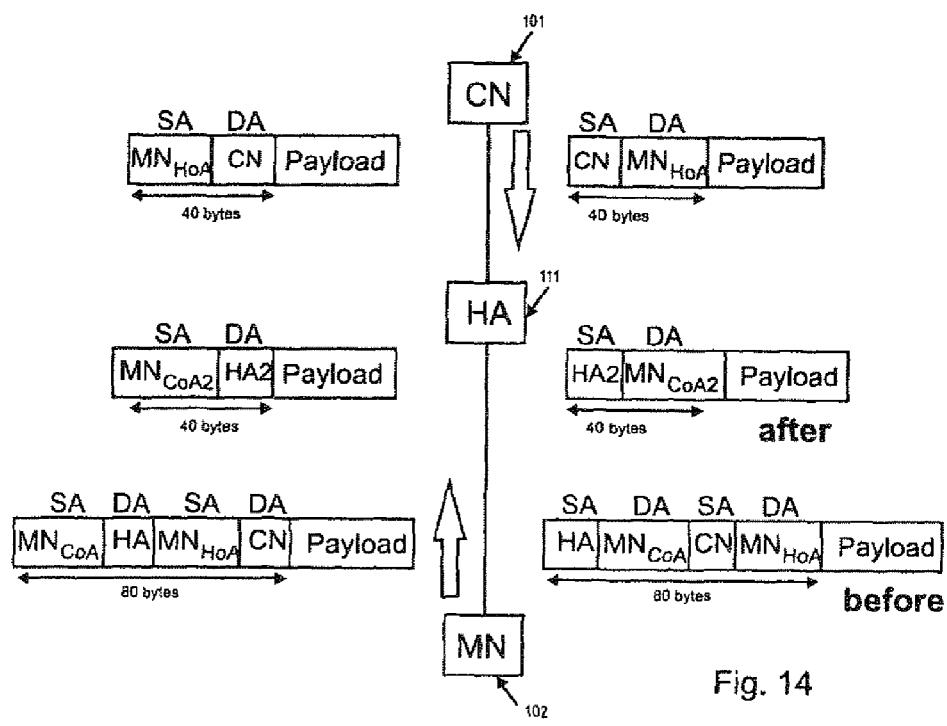
Figure 15:
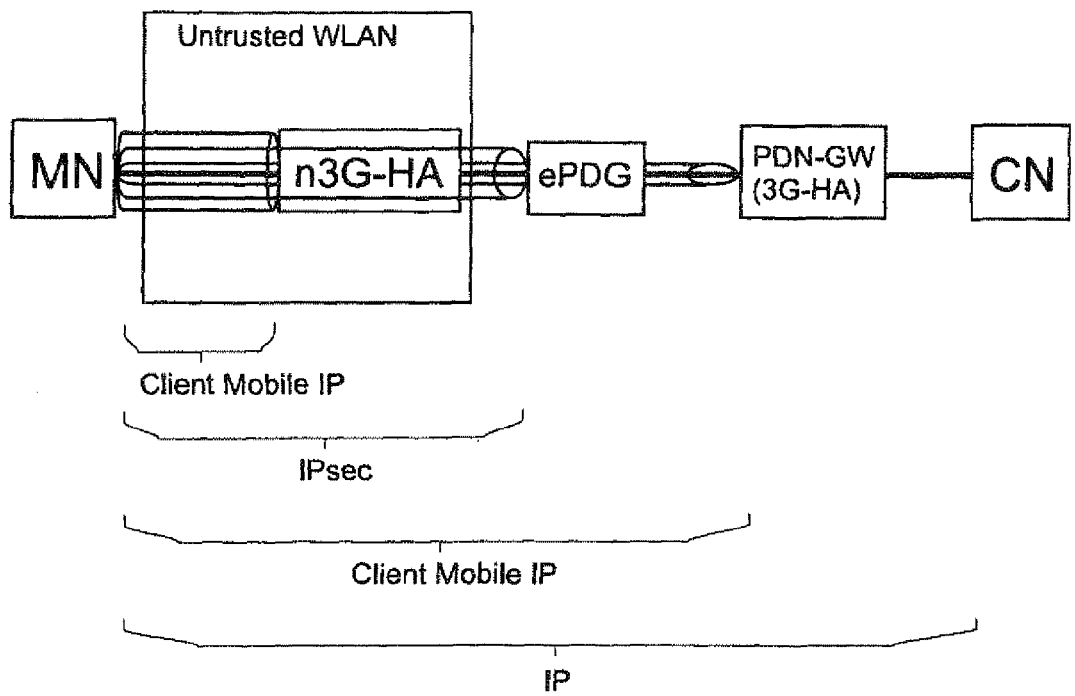
Figure 16:
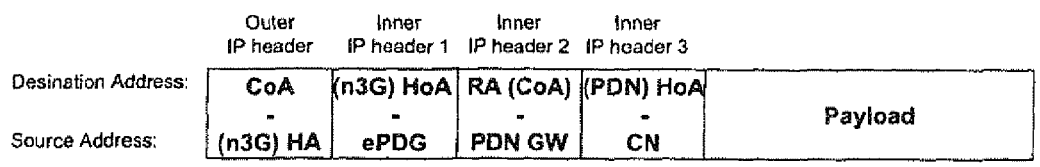
Figure 17:
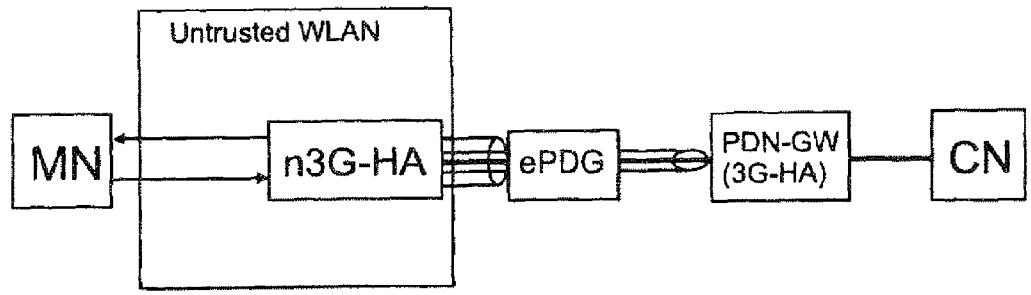
Figure 19:
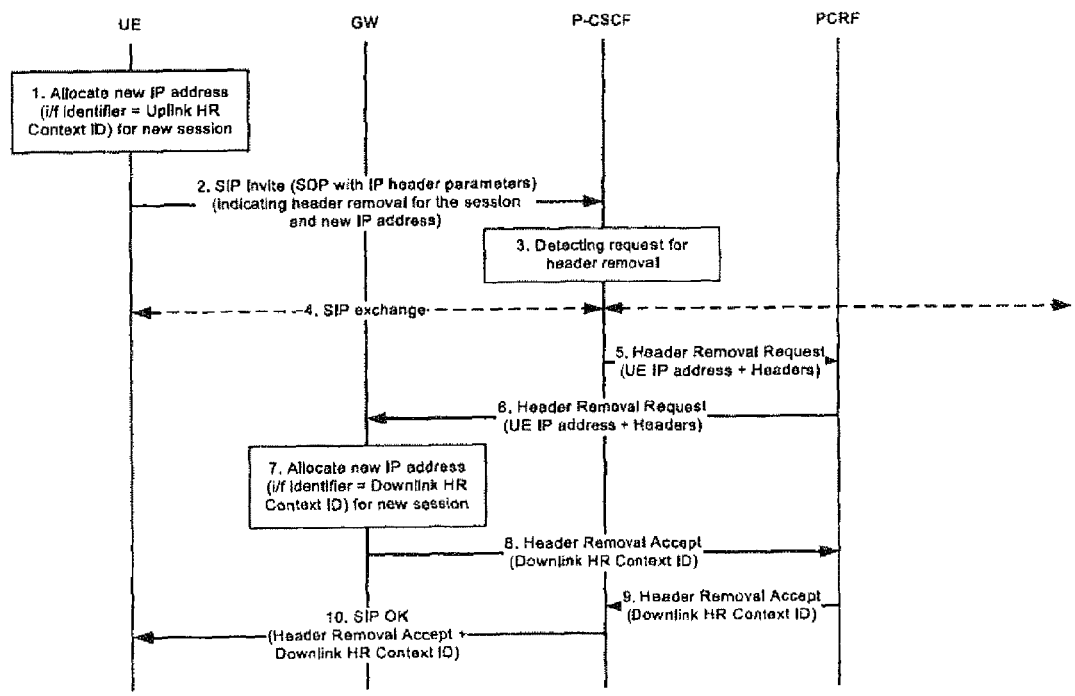
Figure 18:
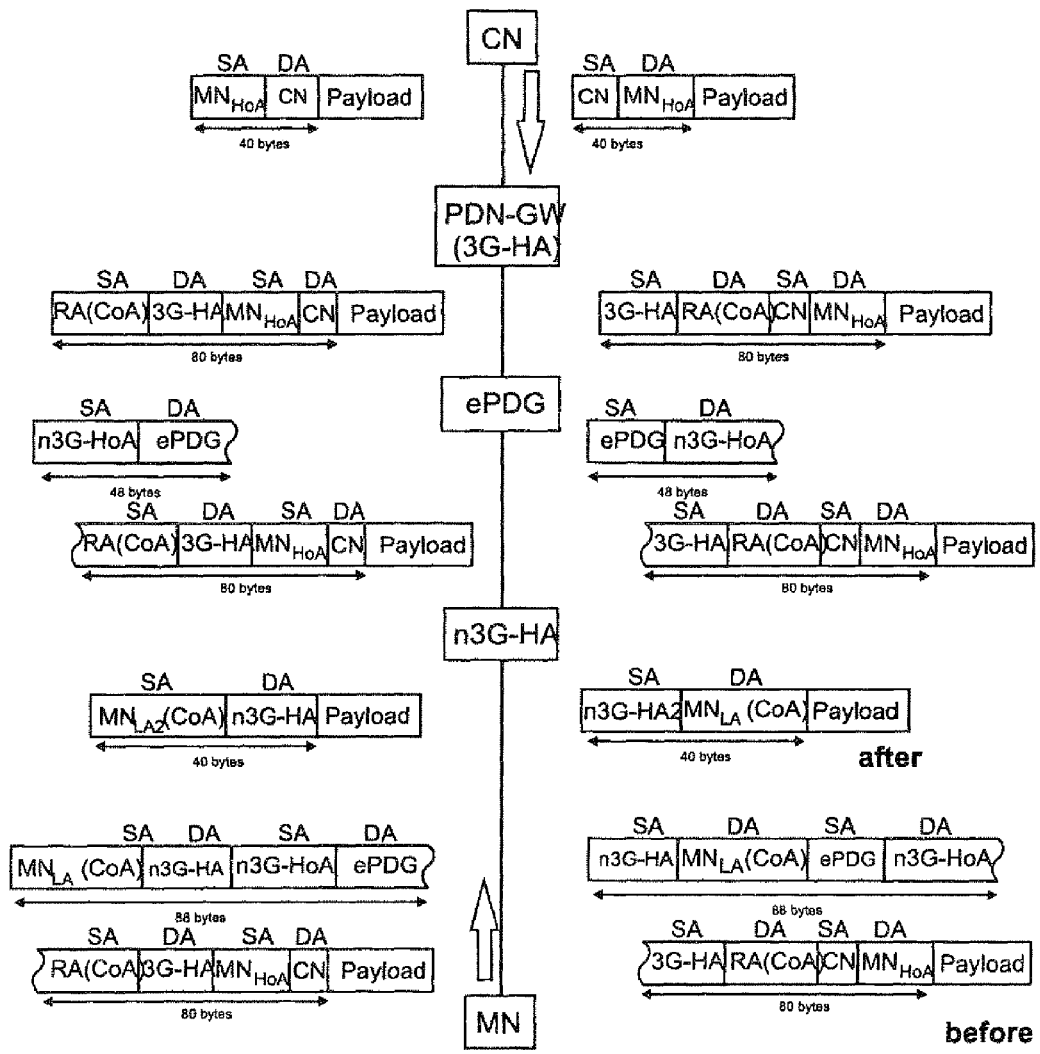
Figure 20:
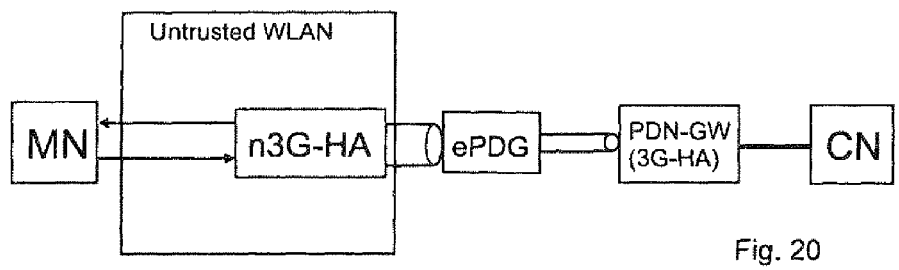
Figure 21:
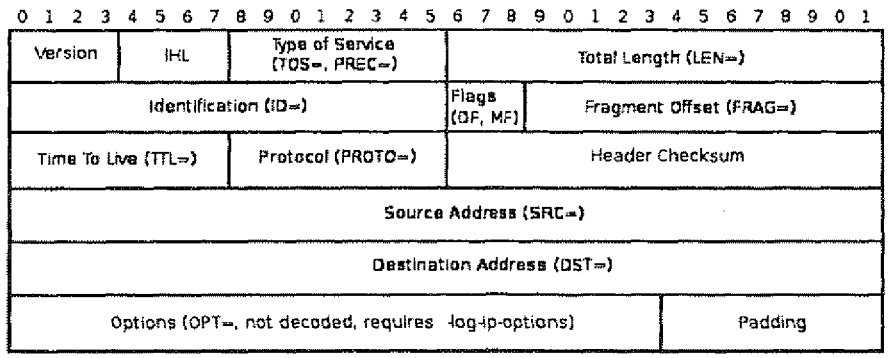
Figure 22:
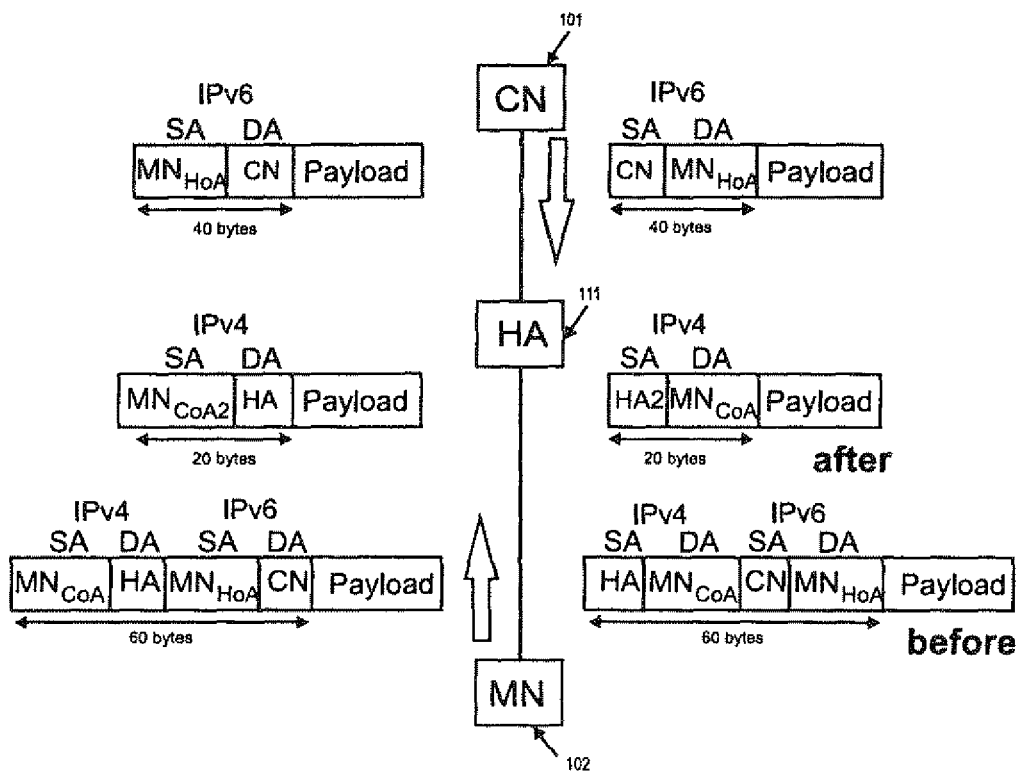
Figure 23:
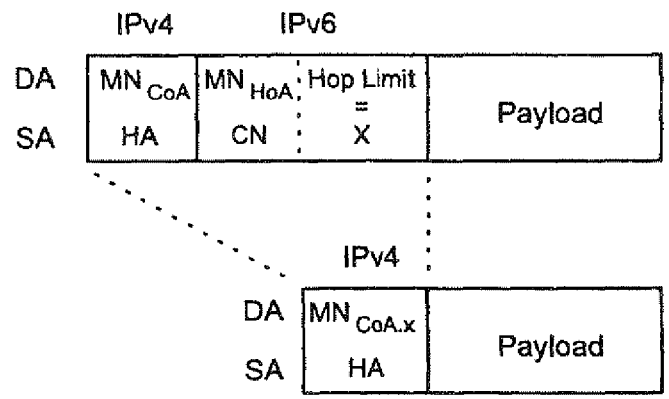
Figure 24:
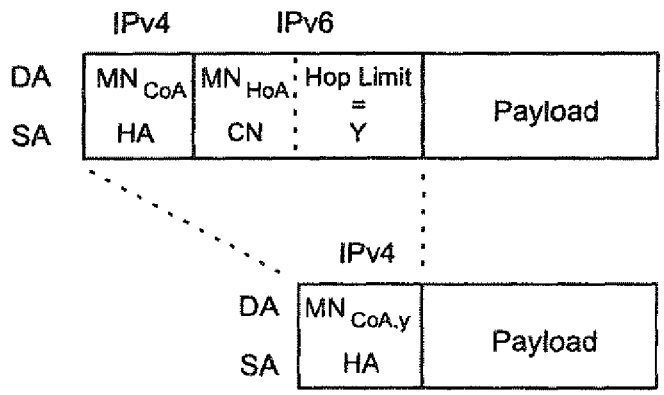
Figure 25:
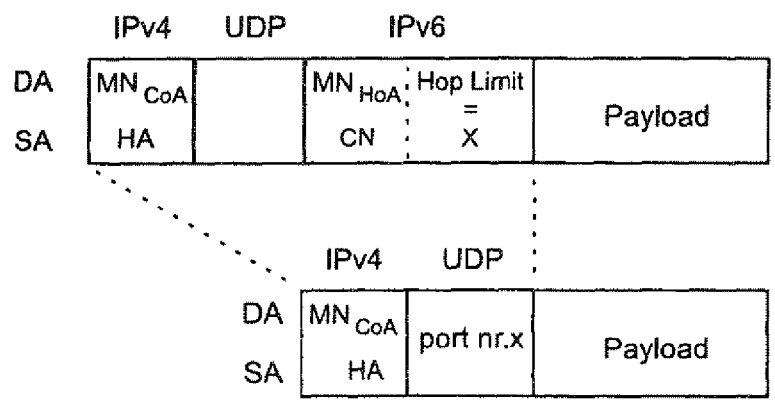
Figure 26:
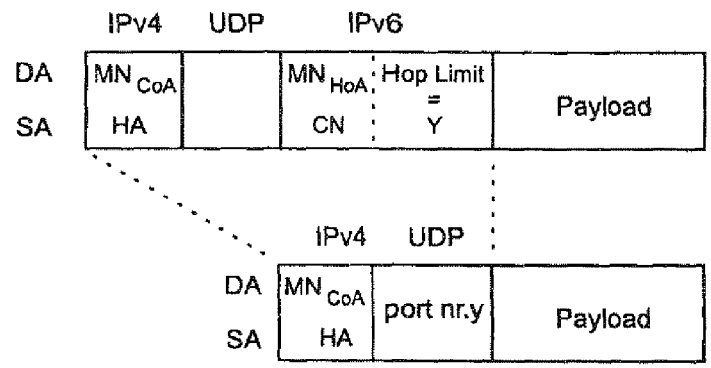
Figure 27:
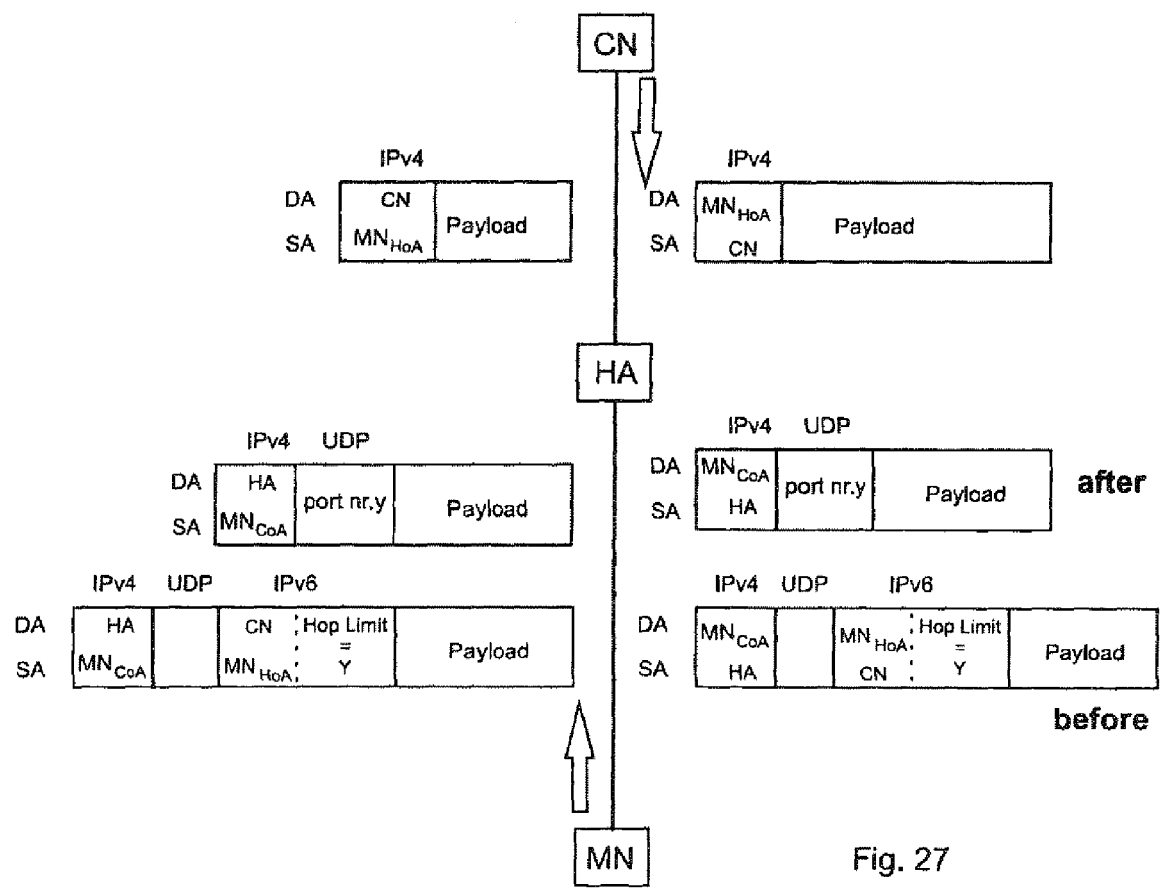
Figure 28:
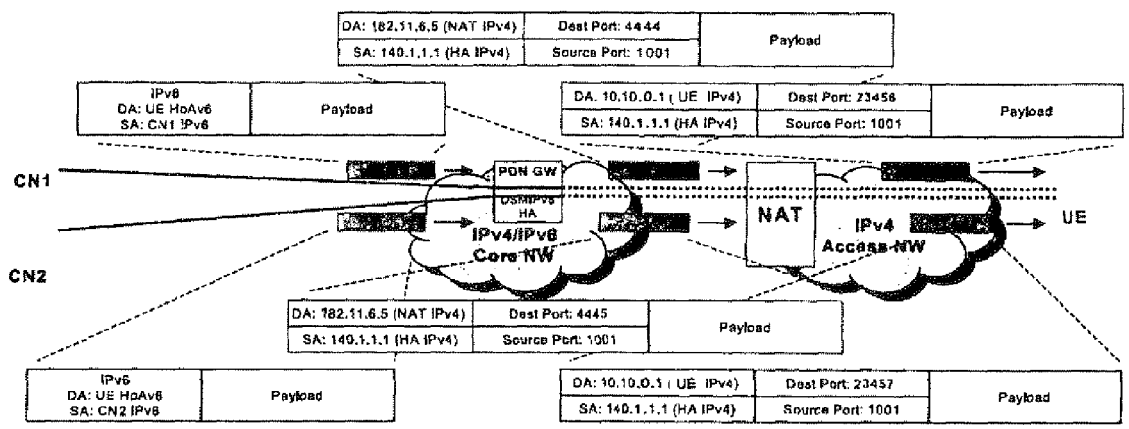
Figure 29:
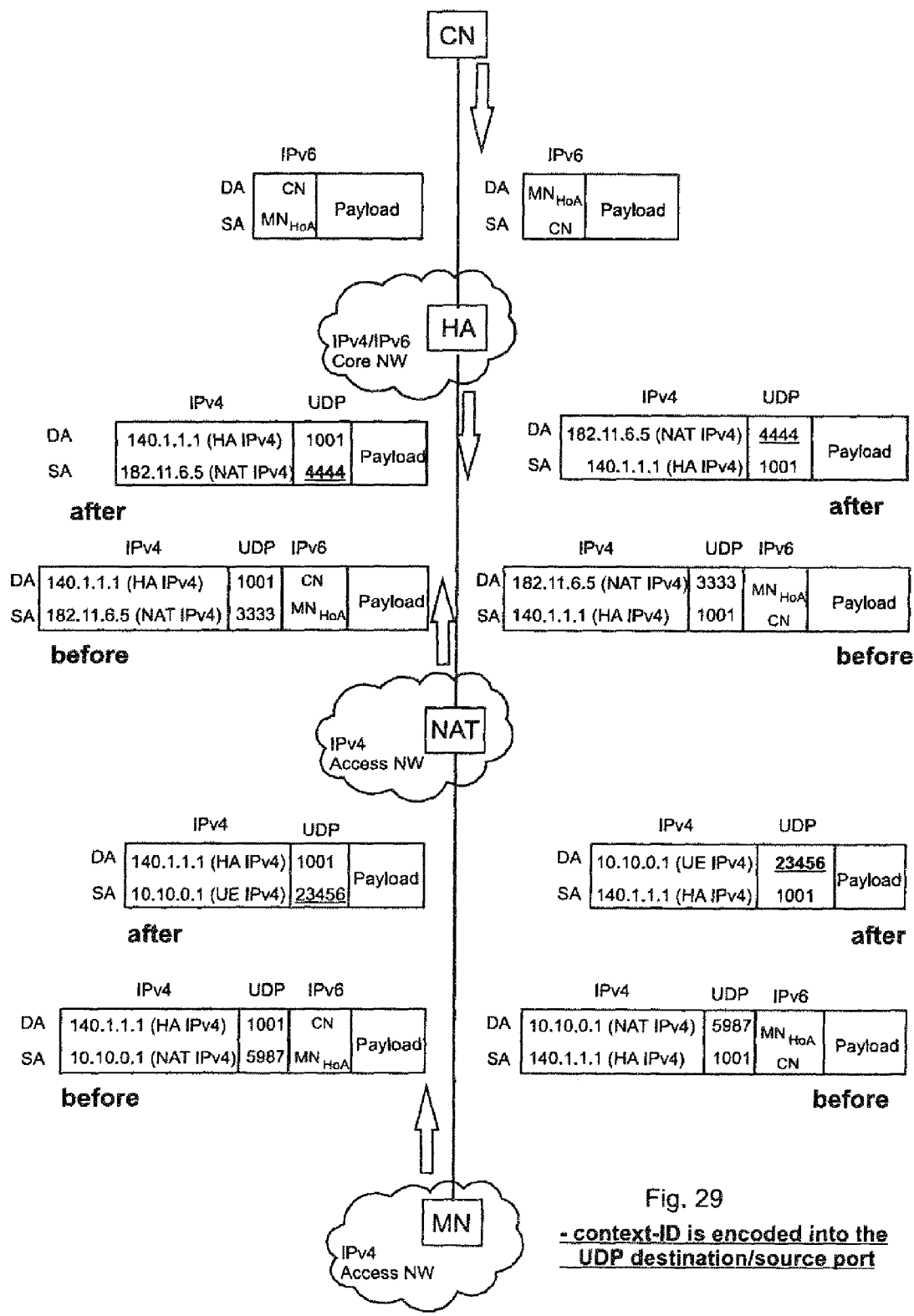
Figure 30:
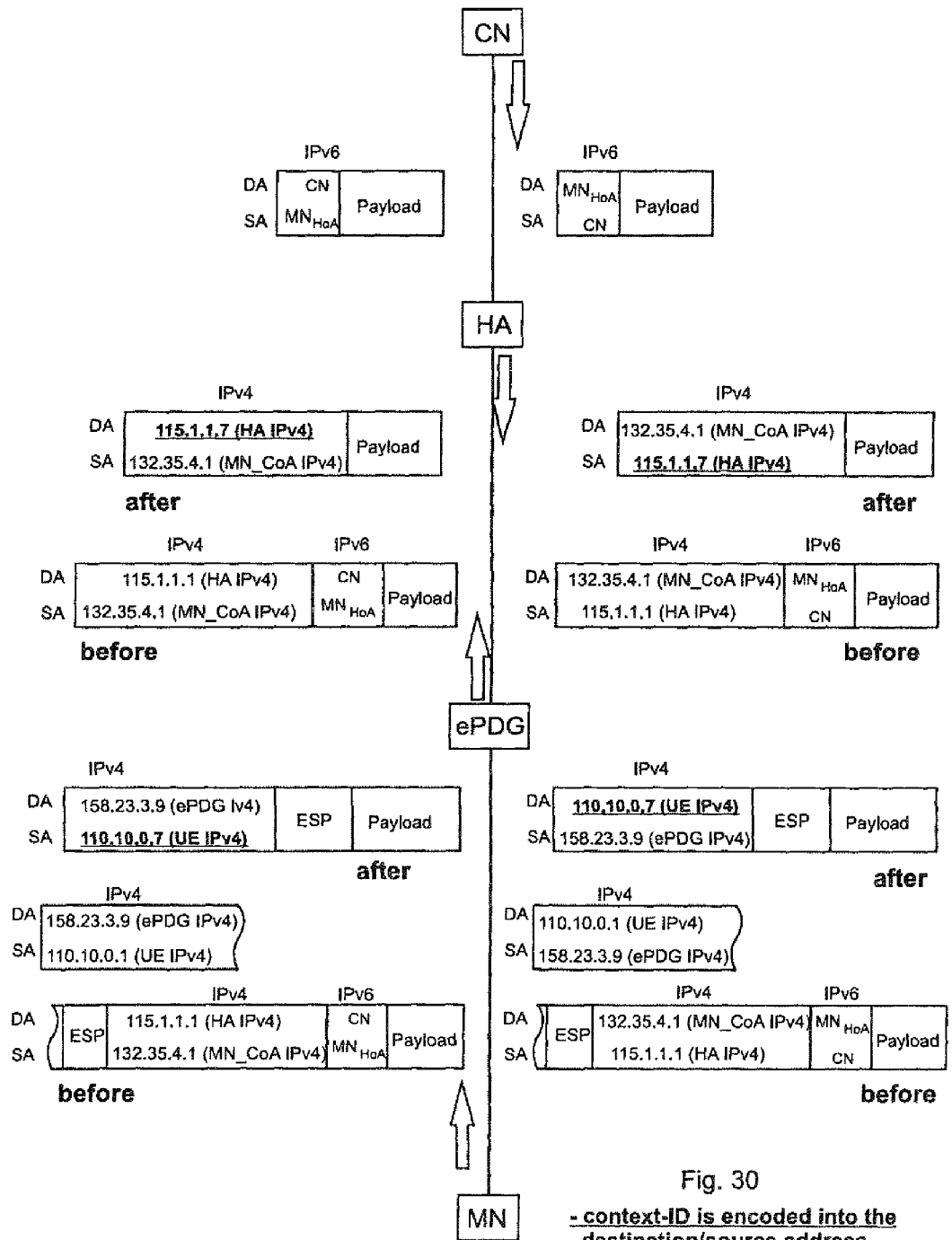

FIG. 1 exemplifies the use of bi-directional tunneling for a communication between a mobile node and a correspondent node according to MIPv6, FIG. 2 exemplifies the use of route optimization for a communication between a mobile node and a correspondent node according to MIPv6, FIG. 3 shows the data packet formats used during communication between a MN and a ON, when in bidirectional tunneling mode of MIPv6, shows a standard IP header, with the various header fields, FIG. 5 shows the data packet formats used during the communication between a MN and a ON, confronting the data packet format on the communication path between the HA and the MN, before and after applying the embodiment of the invention, in which two new addresses are used to remove/reconstruct the inner headers, FIG. 6 is as signaling diagram illustrating the message exchange between MN and the HA for initiating the header removal according to the embodiment of the invention, in which two new addresses are used to remove/reconstruct the inner headers, depicts the IP header, wherein the Header Removal Context Identifier according to one embodiment of the invention is the interface identifier of an IP address in the source address field, FIG. 8 is a signaling diagram illustrating the message exchange between the MN and the HA for initiating the header removal according to another embodiment of the invention, in which only one new address is used to remove/reconstruct the inner headers, FIG. 9 illustrates the data packet formats used during the communication between the MN and the CN, confronting the data packet format on the communication path between the HA and the MN, before and after applying an embodiment of the invention, in which only one new address is used to remove/reconstruct the inner headers, FIG. 10 is a signaling diagram illustrating the message exchange between the MN and the HA for initiating the header removal according to another embodiment of the invention, in which a hash value is calculated and transmitted to the HA instead of the actual inner headers, FIG. 11 depicts the IP header according to a different embodiment of the invention, wherein the value of a changing field (here, the inner hop limit) is also encoded into the source address, FIG. 12 shows an IP header of a downlink/uplink data packet according to another embodiment of the invention, in which a hybrid approach is conducted, wherein the changing field is encoded into the source address of the outer header, and the static fields are encoded into the destination address of the outer header, FIG. 13 illustrates an IP header of an uplink/downlink data packet according to the previous embodiment of the invention, wherein the changing field is encoded into the destination address of the outer header, and the static fields are encoded into the source address of the outer header, FIG. 14 illustrates the data packet formats used during the communication between the MN and the CN, confronting the data packet format on the communication path between the HA and the MN, before and after applying the previous embodiment of the invention, in which an hybrid approach is conducted, FIG. 15 shows an overview of a network scenario of another embodiment of the invention, in which the MN is located in a WLAN, wherein the various tunnels between the various entities are illustrated, FIG. 16 shows a data packet header for the previous embodiment of the invention, which contains one outer header and three inner header, FIG. 17 shows an overview of a network scenario, in which the embodiment of the invention has been performed between the HA and the MN, thereby resulting in two different flows, for uplink and downlink, FIG. 18 illustrates the data packet format used during the communication between the MN and the ON, confronting the data packet format on the communication path between the HA and the MN, before and after applying the previous embodiment of the invention, FIG. 19 is a signaling diagram for the embodiments of the invention, when using the SIP/SDP extension, FIG. 20 shows an overview of a network scenario, in which an embodiment of the invention has been applied, the embodiment sequentially performing header removal with the various network entities in the network, FIG. 21 shows a standard IPv4 header with the corresponding header fields, FIG. 22 shows the data packet formats used during the communication between a MN and a CN, confronting the data packet formats on the communication path between the HA and the MN, before and after applying one embodiment of the invention, in which two IPv4 source addresses are used to remove/reconstruct the inner headers, FIG. 23 compares data packets, before and after applying one embodiment of the invention, in case an outer IPv4 header is employed and further in case a particular value X in a changing field of the inner headers is encoded into an address of the resulting outer header, FIG. 24 compares data packets, before and after applying one embodiment of the invention, in case an outer IPv4 header is employed and further in case a particular value Y in a changing field of the inner headers is encoded into an address of the resulting outer header, FIG. 25 compares data packets, before and after applying one embodiment of the invention, in case an outer IPv4 header is employed and further in case a particular value X in a changing field of the inner headers is encoded into a port number, FIG. 26 compares data packets, before and after applying one embodiment of the invention, in case an outer IPv4 header is employed and further in case a particular value Y in a changing field of the inner headers is encoded into a port number, FIG. 27 shows the data packet formats used during the communication between a MN and a CN, confronting the data packet formats on the communication path between the HA and the MN, before and after applying one embodiment of the invention, in which port numbers are used as Context-identifiers, FIG. 28 shows the data packet formats used during the communication between a MN and two CNs, CN1 and CN2, after applying one embodiment of the invention, in which port numbers are used as Context-IDs, FIG. 29 shows the data packet formats used during the communication between a MN and a CN, confronting the data packet formats on the communication path between the HA and the MN before and after applying one embodiment of the invention, in which a NAT router is assumed to be located between the HA and the MN and port numbers are used as Context-IDs for the header removal, and FIG. 30 shows the data packet formats used during the communication between a MN and a CN, confronting the data packet formats on the communication path between the HA and the MN before and after applying one embodiment of the invention, in which an ePDG is assumed to be located between the HA and the MN and addresses are used as Context-IDs for the header removal,

DETAILED DESCRIPTION

Definitions

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

An encapsulated header is any kind of header which is encapsulated by another header.

A concatenation of headers means at least two header that are sequentially arranged, including the exact relationship between the headers in the concatenation as well as the content of each header in the concatenation.

The following paragraphs will describe various embodiments of the invention. For exemplary purposes only, some of the embodiments are outlined in relation to a 3GPP communication system. It should be noted that the invention may be advantageously used for example in connection with a mobile communication system such as the 3GPP communication system, but the invention is not limited to its use in this particular exemplary communication network.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems.

Figure 4:
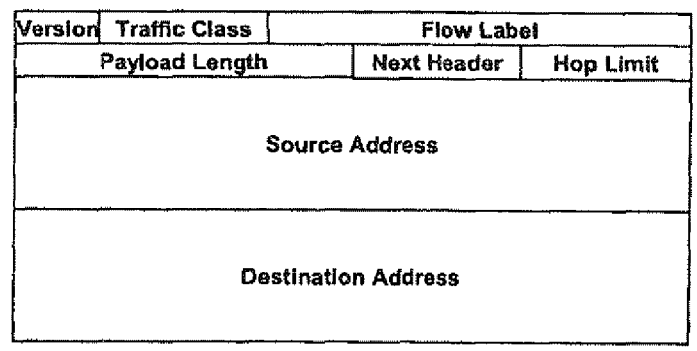

Before discussing in detail the various embodiments of the invention, an IP header is presented in FIG. 4. The header is required for every data packet. It contains addressing and control information that are used to manage the processing and routing of the data packet.

FIG. 5 shows the corresponding header formats of data packets exchanged between the CN 101 and the MN 102 via HA 111, before and after applying one embodiment of the invention. Apparently, the network architecture is very similar to FIG. 3 which has been introduced and discussed before. The concatenation of headers is composed of two IP headers, in this example resulting from the MIPv6 Protocol.

According to the embodiment of the invention, a new address is used in the outer header to exchange the data packet between the MN and the HA, and the inner header is removed before actually sending the data packet. In more detail and with reference to FIG. 5, in this embodiment of the invention the source address of the outer header of each data packet is used to code the removed inner header. That is, a new address is used as source address of the data packets on said communication path between the HA and the MN. For instance, instead of using the original address HA of the Home Agent, a new address HA2 is used as source address for data packets being transmitted from the Home Agent 111 to the MN 102. At the same time the inner IP header is removed from the downlink data packet. Analogically, a new address $MN_{CoA2}$ is inserted in place of the original address $MN_{CoA}$ of the MN as source address for data packets that are transmitted from the MN 102 to the HA 111, and the encapsulated header is deleted before actually sending the data packet to the HA.

In order for the receiving entity, be it the MN or the HA, to reconstruct the concatenation of headers including the encapsulated header which was previously deleted by the transmitting entity, be it the HA or the MN, it is necessary to hold appropriate context information in the entities. In more detail, the HA needs to know the exact content of the encapsulated header which was deleted by the MN. Furthermore, since the new address $MN_{CoA2}$ used in the outer header of the received data packet is employed to encode the inner header, and an association between the deleted inner header and the new address, which serves as context ID must be available in the HA. Correspondingly, when the HA receives a data packet with the source address of $MN_{CoA2}$, it recognizes by means of the new source address the data packet as a data packet on which the header removal procedure according to the embodiment of the invention has been applied.

Consequently, the HA then inserts the encapsulated header, which was previously stored in the HA in any kind of memory, into the received data packet. The outer header may also be adapted to resemble the outer header before the embodiment of the invention is applied, so that at the end, the complete concatenation of headers is restored, including the outer header. Precisely, the source address $MN_{CoA2}$ in the outer header is substituted with the original address $MN_{CoA}$ of the MN. Then, the data packet is passed up to higher layers in a usual fashion. Alternatively, the outer header may just be removed after reception of the data packet from the MN.

Conversely, the MN recognizes a data packet as a data packet which has undergone the header removal procedure according to the embodiment of the invention when the source address in the outer header of the received data packet is HA2. Upon recognizing such a data packet, the MN tries to match the address HA2 with a corresponding encapsulated header, which has been previously stored in any kind of memory. The associated encapsulated header is then inserted into the data packet, and the outer header is either adapted as well, or just removed, as explained above.

Thereby, it is possible to significantly reduce the size of a data packet transmitted between the HA and the MN. In more detail, the size of the header before the execution of the embodiment of the invention is 80 bytes, since two IP headers are present. In contrast thereto, after applying the embodiment of the invention only one header remains, and thus only 40 bytes overhead. Apparently, the header size is reduced by a factor of 2 which brings an important reduction in bandwidth usage for the path between the two end entities.

However, it should be noted that the invention is not restricted to remove complete inner headers. The principles of the invention apply as well for removing only specific parts of the inner header(s). For instance, the address fields (source and destination address) may be removed from the inner headers, while maintaining the remaining inner header structure and content. Which parts of the inner headers are to be removed is completely up to the entity which decides on said aspect, or on the operator.

FIG. 6 illustrates a signal exchange between the MN and the HA for enabling the embodiment of the invention, in which the MN decides which headers are to be removed in case there are more than one header (will be discussed later)

or not the complete inner header is to be removed, but only part of it. Also, the MN may decide which headers are to be removed in the downlink as well as in the uplink direction of the data flow between HA and MN. It should be noted that at least one entity needs to have the capability to decide whether to apply the embodiment of the invention, and in case the embodiment of the invention is to be applied, whether to remove all inner header or only parts thereof in the uplink and downlink direction. For instance, there may be cases in which the inner header has fields that change from packet to packet within a specific IP flow, which would make the execution of the embodiment of the invention difficult; however, this will be explained in more detail later.

It is assumed that the UE decides to remove the complete inner header as illustrated in the example of FIG. 5. Further, in this exemplary embodiment of the invention the procedure is initiated by the MN, and since the source address is used to encode the context-ID by which the inner header information is identified into the outer header, both the MN and the HA need to configure a new IP address.

In said respect, there are two mechanisms for dynamic, i.e. no manual or static, configuration of IPv6 addresses in hosts: stateful and stateless address autoconfiguration. Stateless autoconfiguration requires no manual pre-configuration of hosts, minimal configuration of routers and no additional servers in the network. The stateless mechanism allows a host to generate its own addresses using a combination of host-specific information (e.g. layer 2 address) for the interface identifier and prefix information advertised by routers. Routers advertise prefixes that identify the subnet(s) associated with an IP link, while hosts generate an "interface identifier" that uniquely identifies an interface on a subnet. An address is formed by combining the advertised prefixes and unique identifier. In the absence of routers, a host can only generate link-local addresses with a well-known prefix. However, link-local addresses are solely sufficient for allowing communication among nodes attached to the same IP link.

In the stateful autoconfiguration model, hosts obtain IP addresses and/or configuration information and parameters from a server. Said server maintains a database that keeps track of which addresses have been assigned to which hosts.

It is also possible to use both stateful and stateless address autoconfiguration simultaneously. For example, one IP address can be configured using stateful autoconfiguration and another IP address using stateless autoconfiguration or an IP address may be formed based on the stateless mechanism, but other IP configuration parameters, e.g. Maximum Transmission Unit (MTU) size, may be configured by a central server.

Figure 7:
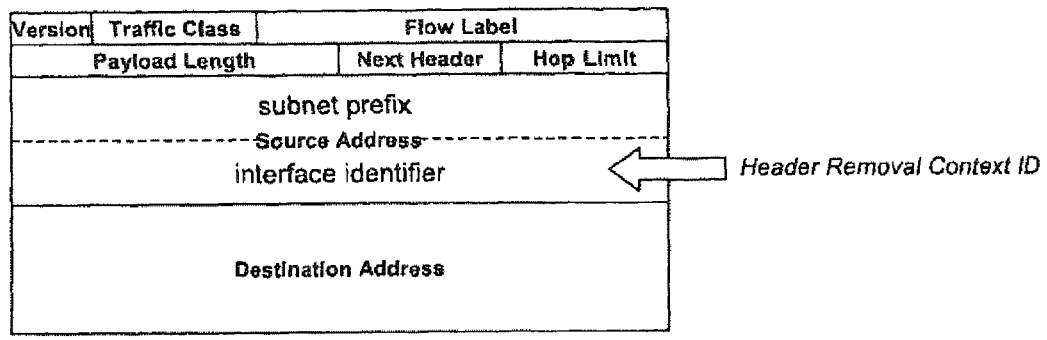

For example, assuming that the MN uses stateless address autoconfiguration for configuring the IP address, different interface identifiers are generated and used to identify and reconstruct the original inner header. That is, a possible new IP address $MN_{CoA2}$ has the same prefix (which is necessary for the correct routing of an incoming packet), but has a different interface identifier than the original address $MN_{CoA}$. In this case the interface identifier can be referred to as a Header Removal Context Identifier, shown in FIG. 7. Only half of the source address is illustrated as Header Removal Context-ID, since in this example embodiment only the interface identifier of the new IP address $MN_{CoA2}$ of the MN is changed compared to the original one.

In general, compression mechanisms, like ROHC, reduce the header size by including a Context identifier in an additional header that is appended to the outer header. According to another embodiment of the invention, it is also possible to use the mechanism of e.g. ROHC and encode the ROHC Context identifier into the source and/or destination address, as discussed before.

In those cases in which the subnet in which the MN is located possesses more than one subnet prefix, it is also possible to configure a full new IP address to later reconstruct the original inner headers. This means that the subnet prefix as well as the interface identifier are changed in the new address $MN_{CoA2}$ in respect to the original address $MN_{CoA}$. In this case, the full IP address can be described as the Header Removal Context Identifier, this is however not shown in FIG. 7, which only illustrates the Header Removal Context ID being the interface identifier.

Similar considerations apply to the case in which the MN uses stateful address autoconfiguration (e.g. based on DHCP) to configure the IP address.

After discussing a possible allocation of a new IP address in the MN we return to FIG. 6 in which it is illustrated that a new IP address is configured, with the interface identifier being the Uplink Header Removal (HR) Context-ID.

Though not illustrated in FIG. 6, it is necessary for the MN to also retain the information about the headers which are to be removed and the new IP address $MN_{CoA2}$ for later use. Subsequently, the MN informs the HA with a Header Removal Request message comprising the Uplink HR Context-ID and information on the headers, i.e. the uplink headers that should be reconstructed and the downlink headers that should be removed. By transmitting both headers, the HA is later able to perform the reconstruction by inserting the indicated uplink header, as well as the removal by recognizing those data packets with the indicated downlink headers and removing the indicated downlink headers.

The Home Agent receives the HR Request and starts to configure a new IP address HA2 for itself. Since the HA has the same possibilities to generate a new IP address than the MN, no further detailed discussion on this topic is conducted at this point. As apparent from FIG. 6, the HA generates a new IP address HA2 by changing the interface identifier of the original address HA, which is then used as the Downlink HR Context-ID.

Furthermore, the HA generates a context for reconstructing the uplink inner header by associating the Uplink HR Context ID, being the new IP address $MN_{CoA2}$ of the MN and being in particular the new interface identifier of the $MN_{CoA2}$, with the inner header which is to be removed from uplink packets by the MN.

The MN needs to be informed about the new allocated IP address of the HA, so as to be able to recognize is received data packets among the data packets received from the HA, in which the inner header is to be restored. Accordingly, the HA transmits a Header Removal Response to the MN comprising the Downlink HR Context ID expected by the MN, which is the new address HA2, and in particular, the new interface identifier therein. Upon receiving the Header Removal Response, the MN is now able to generate a context for restoring the deleted downlink inner header by associating the Downlink HR Context ID with the inner header which will be removed by the HA, so as to be able to later reconstruct the removed encapsulated header of received data packets. For instance, the MN can set up a particular table for the header removal procedure according to the embodiments of the invention, in which a specific IP address in a source field of a received data packets is associated with the appropriate inner headers which have to be inserted to achieve the correct data packet structure.

It should be easily understood by a skilled reader that many variants are possible for the above suggested signaling between the HA and the MN. The important thing that is to be achieved by said signaling is that both of the participating entities must know which header(s) are to be removed/reconstructed, must know the corresponding Uplink/Downlink HR Context Identifiers by which the received data packets, that are to be removed/reconstructed, are encoded/identified, and must know which inner headers are then to be inserted into the received and identified data packets. In other words, there should exist some means between the endpoints to inform each other about the relation between the outer header information and the inner headers. After the reconstruction there should be no difference to data packets received without applying the header removal procedure of the invention.

Apparently, the signaling may be done in various ways. For example, instead of the MN initiating the signaling procedure, it may be the HA which starts to decide which headers are to be removed, which allocates a new address and transmits the Header Removal Request to the MN. Thus, the signaling procedure exemplified in FIG. 6 is performed conversely.

Furthermore, it may be that the MN does not decide about the headers which are to be removed in uplink and downlink, but only in uplink or downlink. Then, the HA would decide the headers which are to be removed from the downlink or the uplink and inform the MN accordingly about the decision. Other alternatives will become apparent to the skilled reader from the remaining description in which other embodiments for the signaling procedure will be presented as well.

As a result from the signaling procedure as exemplified in FIG. 6, the HA and the MN are now able to perform the header removal according to the embodiment of the invention.

More specifically, when a downlink data packet from the CN 101 arrives at the HA 111, the HA recognizes the data packet by means of the specific header structure as a data packet on which header removal according to the embodiment of the invention is to be applied. Accordingly, the HA inserts the IP address (in FIG. 5: HA2), which was specifically allocated for that purpose, into the source address of the outer header, and removes the inner header(s) from the data packet structure. The changed data packet now only consists of one header and the payload, and is forwarded to the MN. The MN in turn receives said changed data packet from the HA and recognizes by means of the source address (in FIG. 5: HA2) the data packet as a data packet that has undergone the header removal according to the embodiment of the present invention. Correspondingly, the MN knows that reconstruction has to be conducted and performs a look-up operation for the source address. Provided that at the beginning of the signaling procedure of FIG. 6 a context was generated for reconstructing the downlink inner header, the MN can uniquely identify said context by the source address (HA2), and the MN can now insert the appropriate inner header into the received data packet and adapt the outer header with the original source address HA. Thus, the MN eventually obtains the same data packets as if no header removal would have been applied, and can further process the received data packet as usual.

Conversely, a data packet which is to be transmitted from the MN to the HA, is to be reduced in size as well. The MN determines that a particular data packet belongs to those data packets that have to undergo the header removal according to the embodiment of the invention by recognizing the inner header. Then, the source address of the outer header is changed to the new IP address $MN_{CoA2}$ of the MN, configured before, and the inner header is deleted completely. Thereupon, the data packet is transmitted to the HA, which receives the data packet and recognizes same by means of the address ($MN_{CoA2}$) in the source address field of the (outer) header as a data packet, whose concatenation of headers needs to be restored. Correspondingly, the correct encapsulated header is looked-up and then inserted into the received packet. Further, the outer header, and in particular the source address, is adapted so as to resemble to the outer header as originally provided, i.e. the address $MN_{CoA2}$ in the source address field is replaced by the original address $MN_{CoA}$ of the MN. The thus-reconstructed data packet can then be processed as before the implementation of the invention.

In order to abort the header removal procedure of the invention, it suffices to inform both entities that no further header removal or reconstruction is to be performed. This may be done by one of the two participating entities or especially by the entity which initiated the Header Removal, this is however not restricted thereto. Any entity that knows or is informed about the imminent abortion of the header removal procedure can in turn notify the participating entities. Then, the entities stop to remove and/or reconstruct data packets.

One advantage of using the source IP address to code therein the encapsulated header that are to be removed from a data packet, is that there is no need for the sender to configure the source interface with all IP addresses that are used for header removal, because the sender does not necessarily receive packets with this address as destination address. One shortcoming of encoding the HR Context ID in the source address fields of data packets, is that it requires that both endpoints are able to allocate multiple IP addresses.

However, it is possible to re-use a newly configured IP address for several Header Removal sessions, that is, it is not necessary to always configure a new IP address for each new Header Removal Procedure that is started. For instance, it is assumed that for a first HR session on a communication path between the MN and the HA, the new IP addresses HA2 and $MN_{CoA2}$ are respectively configured by the HA and the MN to be used as source address in those data packets from which at least a part of the inner headers is removed. Eventually, a second HR session is initiated on a communication path between another MN2 and the HA. In said case, the previously configured new IP address HA2 may also be used as source address of data packets transmitted to the other MN2. Obviously, the other MN2 upon receiving data packets with HA2 as source address, recognizes said packet and can restore the original concatenation of headers from the context which was initially saved during Header Removal Start Procedure.

Conversely, the MN may also re-use its IP address $MN_{CoA2}$ for another HR session with another Home Agent (in case the MN has more than one Home Agent).

In a further embodiment of the invention, as illustrated in FIG. 8 only one address, here the IP address of the HA, is used to identify the inner headers in both directions. This may be due to e.g. a limited IP address space in the access network of the UE, wherein the UE is thus not able to allocate additional IP addresses. Similar to the signaling process presented in FIG. 6, the MN presumably first determines the header(s) of the uplink and downlink flow that should be removed. Then, a Header Removal Request is sent to the HA with information on the uplink headers that should be reconstructed and the downlink headers that should be removed.

The Header Removal Request may further include parameters and/or options from which the receiving entity can deduce how the header removal procedure is exactly to be conducted. For example, information that should be comprised in the HR Request can refer to which address field in the outer header is to be used to recognize receiving packets whose inner header(s) have to be reconstructed and to encode inner headers, that are to be removed. Alternatively, this may involve additional signaling to "negotiate" which variant of the header removal shall be used. Also, some or all parameters denoting a particular variant of the invention may be set by the operator of the network, in which one of the participating entities is located.

Referring again to FIG. 8, upon the HR Request is received in the HA, a new IP address is allocated for the downlink and uplink flows, e.g. a new interface identifier is generated while maintaining the same subnet prefix as the original address. According to this embodiment of the invention, said interface identifier corresponds to both the Uplink and Downlink HR Context.

Though not depicted in the signaling diagram of FIG. 8, the HA needs to provide a mapping between the Uplink HR Context ID and the uplink inner header which will be removed by the MN from each uplink data packet. In said respect, a context is provided in the HA, comprising information for reconstructing the uplink inner header, wherein said context in the HA is uniquely indicated by the Uplink HR Context ID.

The HA sends a Header Removal Response to the UE, with the HR Context ID, being the new IP address, or in particular the new interface identifier. Similarly to the mapping in the HA, the MN also needs an association between the HR Context ID and the downlink inner header, that is removed by the HA from each downlink data packet, so as to be able to perform the reconstruction. Correspondingly, the MN holds a context, which allows to transform the incomplete concatenation of headers, in this case only one outer header, into the original complete concatenation of headers.

After the reception of the HR Response, the UE and the HA can start to remove the inner headers. The UE sends the data packets with the appropriate destination address HA2 to the Home Agent, and the Home Agent sends the data packets with the appropriate source address HA2 to the UE. The other endpoint recognizes the data packets based on the HR Context ID in the source/destination address and can reconstruct the headers, by inserting the inner headers which are stored in their memories, using the context tagged by the HR Context ID FIG. 9 illustrates the use of the new address HA2 of the Home Agent as sole indicator/encoding information in the data packets. As can be seen, the original address HA of the Home Agent in the source address field of downlink data packets and the destination address field of uplink data packets is replaced during the header removal by the new address HA2.

So when comparing the use of the source IP address with the use of the destination IP address to encode the context ID, it follows that both have its advantages and drawbacks, which are summarized in the subsequent table. The following table is explained for a scenario when the header removal is applied on the communication path between the UE and the HA.

TABLE 1

Comparing the use of source against destination IP address for inner header identification according to different embodiments of the invention

|  | Context ID encoded in IP source address | Context ID encoded in IP destination address |
|---|---|---|
| Uplink | Advantages<br>No need to configure additional IP addresses on the interface of | Advantages<br>No need for UE to allocate multiple IP addresses |

TABLE 1-continued

Comparing the use of source against destination IP address for inner header identification according to different embodiments of the invention

|  | Context ID encoded in IP source address | Context ID encoded in IP destination address |
|---|---|---|
|  | UE<br>No need for HA to allocate multiple IP addresses (tunnel endpoint checks source address only to identify context and reconstruct headers)<br>Drawbacks<br>UE must be able to allocate multiple IP addresses | Drawbacks<br>HA must be able to allocate multiple IP addresses<br>HA must configure additional IP addresses on interface |
| Downlink | Advantages<br>HA can re-use IP addresses for different UEs<br>No need to configure all IP addresses on interface of the HA<br>Drawbacks<br>HA must be able to allocate multiple IP addresses | Advantages<br>No need for HA to allocate multiple IP addresses<br>Drawbacks<br>UE must be able to allocate multiple IP addresses<br>UE must configure additional IP addresses on interface |

In the high level signalling procedure shown in FIG. 6 or 8 it is assumed, that always the whole header information is transferred in the Header Removal Request. In order to reduce the amount of data that is to be transmitted with the Header Removal Request it is suggested to transmit a hash value, by which the actual uplink and downlink header may be deduced, instead of transmitting the complete uplink and downlink header. More specifically, after the MN determines which headers are to be removed from uplink and downlink data packets, the MN selects particular fields from the inner headers (e.g. source and destination IP address) or the complete inner header and generates a hash value (one for uplink and one for downlink) out of them by performing a special hash function.

Consequently, in order to indicate the uplink and downlink inner header to the HA, it suffices to transmit the two hash values along with information about which header parts have been used to calculate the hash values and information about the particular hash function itself. Naturally, a skilled reader is aware that the header fields and the particular hash function which are used to calculate the hash values can also be agreed in advance, so that it is only necessary to transmit the hash values, but no information about hash function or header fields.

Hence, the Header Removal Request according to this embodiment of the invention consists of two hash values, the configured new address of the MN and optionally of information about the particular hash function and the header fields used for the calculation.

When the HA receives said Header Removal Request message, the HA is able to perform the particular hash function, already used in the UE, on the agreed or indicated header fields of data packets in the uplink and downlink flows. The calculated hash values for downlink and uplink data packets are matched in the HA against the received hash values in the Header Removal Request. Thereby, the headers which were determined by the MN to be removed/reconstructed are eventually identified in the HA. Accordingly, a context is established in the HA to reconstruct uplink inner headers, wherein the context is associated with the Uplink HR Context ID, which may be e.g. the new IP address of the MN in those cases in which uplink data packets have the new IP address in their source address fields.

Consequently, the HA is able to recognize the uplink data packets in which the header is to be reconstructed and the downlink data packets from which the headers are to be removed. Depending on the particular embodiment of the invention used, the HA might need to configure a new IP address, which is then signalled to the MN in the HR Response message.

The main advantage achieved thereby is that the Header Removal Request message is smaller in size, since not the complete inner header is transmitted but in the best case only the two hash values. However, in order for the HA to identify the correct data packets it may be that a lot of hash values have to be calculated, which increases the processing load. In order to mitigate this problem, it is possible to signal additional information (e.g. the destination address), so that the HA does not need to calculate too many hash values on all received data packets. By limiting the received data packets to only those with e.g. the particular destination address indicated in the HR Request Message, the processing load can be significantly reduced.

It is possible to further optimize the signalling procedure according to another embodiment of the invention. In particular, so far there is no special requirement on the mechanism that is used to generate the IP address for the header removal session. However, if it is possible for the UE and/or the other HA to generate an arbitrary interface identifier (Header Removal Context ID), for example if a per-node prefix is advertised, then the signalling procedure can be further optimized. In said case, the UE can calculate a hash value over the relevant header fields of uplink and downlink packets as discussed above, and this hash values may be respectively used as interface identifier for the IP address of the MN and/or the HA.

In more detail and referring to FIG. 10, the hash values are calculated based on part (or all) of the uplink and downlink header previously determined by the UE. The uplink hash value is then used by the MN as interface identifier to configure its new address. The Header Removal Context ID is in both directions the interface identifier being the respective hash value. The UE is immediately enabled to generate the context information for restoring the downlink headers, the context being uniquely identified by the Downlink HR Context ID (interface identifier=downlink hash value), since the UE already knows the Downlink HR Context ID which will be used by the HA to encode the inner header of downlink data packets.

The HR Request message is transmitted to the HA, containing the Uplink and Downlink HR Context ID (uplink and downlink hash), and optionally information on the particular hash function and header fields used for the calculation of the hash values. Further optionally, the HR Request may include additional identification information to reduce the amount of data packets on which the calculation has to be performed.

Correspondingly, when the HA receives the HR Request message, it is able to generate a new IP address using the downlink hash value comprised in the message. The HA also knows the IP address by which uplink data packets will be encoded by the MN in case header removal is applied. Since the MN already knows the new IP address which the HA will configure, and in particular, the Downlink HR Context ID (interface identifier being the downlink hash value), there is no need for the HR Response message.

This embodiment is advantageous, because the HR Request message is further reduced in size, now optimally containing the two hash values only, being the uplink and downlink HR Context IDs. The header fields pointer in FIG. 10 is just optional, in case the HA knows which fields are used to perform the calculation, as discussed before. Also, no Response message is necessary anymore, due to the MN already knowing the Downlink HR Context ID.

If Duplicate Address Detection (DAD) for the new IP address of the MN or later for the HA fails, the UE can calculate a new interface identifier using a different hash function or hash key and signal this information again to the HA. Alternatively, in case the DAD for the new IP address of the HA is negative, the HA may arbitrarily configure a new IP address and inform the UE about the new IP address with a HR Response message as usual.

It should be noted that the header removal according to the invention as discussed until now is not restricted to only the inner IP headers. If there are other inner headers that have mostly constant fields (e.g. UDP header), these can be also easily removed and reconstructed as well by applying the same steps as already illustrated before.

With header removal according to the invention, the contexts for reconstructing the original inner headers are identified by the outer header IP addresses, be it the destination or source address. Thus, when a UE is mobile and changes its L3 link, also the outer header uplink source IP address and respectively the outer header downlink destination IP address changes. Therefore, the UE must update the other tunnel endpoint, in this case the HA, with the new IP address. If the UE uses its IP address (instead of the other tunnel endpoint's IP address) to identify inner headers and if there are several header removal sessions, the UE may have to send an update for many IP addresses concurrently, e.g. by using again the Header Removal Request or a Header Removal Update message. In more detail, the UE must configure a plurality of new IP addresses being used as Downlink and/or Uplink HR Context IDs. In order to substitute the associations in the HA with the previous addresses, it is necessary to transmit multiple messages for the multiple Header Removal session respectively comprising the new HR Context ID of the UE and the corresponding inner header.

One possibility to avoid the sending of many update messages at the same time is to use a bulk Header Removal Request/Update procedure, where the UE includes several IP addresses (HR Context Identifiers) and the matching inner header information at once.

One problem with removing the inner headers and encoding the related information into the outer header (e.g. the source address) is, that some fields of the inner header may change from packet to packet, e.g. the hop limit or flow label field of the IPv6 header. Consequently, provided that the context information for reconstructing is not updated for each data packet with a new value in the changing field, the content of the inner headers can not be restored correctly, due to the changing values therein.

However, e.g. the purpose of the hop limit field is to limit packet lifetimes, and thus, changes in the hop limit field can be possibly ignored on the last hop, i.e. the UE will then not be aware of the change of the hop limit value. In particular, the change of the value will not be noticed by the receiving entity, here the UE, since the inner header is restored from information that refers to an initial value at the time of starting the Header Removal Procedure. However, the change of the value does not negatively affect the operation of the UE.

According to another embodiment of the invention, other changing fields, like the flow label and traffic class field, may be handled easily by copying the values into the appropriate field in the outer header and then, at the receiving side, copying them back for the reconstruction. Naturally, this is only possible in case the corresponding field(s) of the outer header are either empty or can be overwritten without causing any problems, e.g. in case the value is irrelevant. Another possibility in case the value in the corresponding field of the outer header is constant, is to include information in the context within the receiving entity for reconstructing the content of the corresponding field in the outer header that is overwritten along with the remaining inner header. For instance, first, the context information is used to reconstruct the inner header except for the changing field. Then, the value of the corresponding field in the outer header is copied into the same field in the inner header. Finally, the context information is again used to reconstruct the corresponding field in the outer header with the correct value, thereby arriving at the same concatenation of header as if no header removal was applied.

Another simple way to cope with changing fields is to identify packets with frequently changing fields and not apply header removal to those tunnelled packets. That is, those data packets with field values that change often are tunnelled like packets without header removal. For example, the most frequent values of the changing fields are determined before and/or during header removal is applied, and only the headers with the most frequent values are removed; i.e. all other packets, having values in the changing fields different from the most frequent one are still tunnelled without applying the header removal procedure of the invention.

Nevertheless, it is desirable to always remove the inner headers, independent from changing values in certain fields of the inner headers that are to be removed. Further, it might be necessary that all fields of the inner headers must be reconstructed correctly and it can be also possible that the outer fields cannot be used, because they are occupied since they are needed for a different purpose (e.g. QoS handling). Then, the inner fields cannot be copied into the appropriate outer fields.

Relating to another embodiment of the invention, it is possible to perform the header removal separately for every changing field, i.e. for every different inner header that shall be removed. In particular, the hop limit field, flow label, traffic class are also encoded into the interface identifier of the outer IP address, as depicted in FIG. 11. Then, if for example different hop limit values may occur for one inner IP source address-IP destination address pair, for every different hop limit value a different outer IP source address (in case the source address is used, as discussed with reference to FIG. 5) is needed for encoding the inner header comprising the different hop limit value.

However, this form of encoding might conflict with a limit of the number of available IP addresses that can be configured on an interface of a tunnel endpoint. Also, if Duplicate Address Detection (DAD) is required for every new allocated IP address, a lot of delay and signalling overhead is added. One possibility to overcome the DAD problem is to assign a per-node IP prefix to a UE, then the UE can configure any interface identifier and does not need to perform DAD.

Another possibility to cope with address exhaustion and changing fields in the IP header is to use a hybrid approach, according to the following embodiment of the invention. This means, that for downlink packets (i.e. from HA to UE) the destination IP address (e.g. an IP address of the UE) of the to be sent packet refers to static fields of inner headers (e.g. the version field, next header field, source IP address, destination IP address) and the source IP address of the tunnel endpoint (e.g. an IP address of the HA) refers to the value of the changing field (e.g. the hop limit). This is illustrated in FIG. 12, which exemplary depicts an outer IPv6 header in which it is assumed that the hop limit value changes from one data packet to another and is encoded into the source address HA2 of downlink data packets. The static part of the inner headers that are removed by the HA are encoded with the new address $MN_{CoA2}$ of the mobile node, which is inserted as destination address in the downlink data packets.

Conversely, the outer header content for uplink packets is shown in FIG. 13. That is, for uplink data packets (i.e. from UE to HA) the source IP address $MN_{CoA3}$ (e.g. an IP address of the UE) of the to be sent packet refers to static fields of inner headers (e.g. the version field, next header field, source IP address, destination IP address) and can be equal to the IP address that is used for the corresponding downlink packets. The destination IP address of the tunnel endpoint (e.g. an IP address HA2 of the HA) can refer to the value of the changing field (e.g. to the hop limit), The header packet formats when applying the hybrid approach is depicted in FIG. 14.

The advantage of this approach is that only one new IP address is needed on the UE's side for identifying the flow. On the other hand, the other tunnel endpoint (e.g. the HA) needs to allocate a larger number of IP addresses to cope with the changing fields. But these IP addresses can be re-used e.g. for tunnelling to other UEs, as already explained.

According to another embodiment of the invention, the MN is located in a Wireless Local Network Area, wherein the WLAN interworks with 3GPP systems. The interworking 3GPP-WLAN will be referred to in the following as I-WLAN. It is especially important to reduce the data traffic in wireless networks, as only a limited bandwidth is available therein. Nevertheless, as may be easily appreciated by a skilled reader it is also possible to implement the principles of the various embodiments of the invention in network architectures that are different from the subsequent WLAN scenario. The support of 3GPP access (e.g. GERAN, UTRAN, E-UTRAN), non-3GPP accesses (e.g. WLAN, WiMAX, 3GPP2, etc.) and also mobility between them is becoming more and more important.

FIG. 15 depicts a simplified overview of a 3GPP-WLAN architecture, wherein the anchor for the mobility between the 3GPP and the non-3GPP accesses is a Gateway, that also provides the interface to the external Packet Data Network (PDN), and is called PDN-GW. The mobility between 3GPP and non-3GPP accesses is based on Mobile IP, whereby the protocol used can be either Client Mobile IP or Proxy Mobile IP. The non-3GPP accesses are separated into trusted accesses and untrusted accesses. The assumption for untrusted accesses is that a UE in an untrusted access needs first a secure tunnel (e.g. based on IPsec) to an evolved Packet Data Gateway (ePDG) before being able to access operator services. The ePDG is similar to the PDG used for Interworking WLAN. On the other hand, this secure tunnel is not needed from trusted accesses. Whether a non-3GPP access is trusted or not is an operator decision and may be different from operator to operator.

In addition, the WLAN includes WLAN access points and intermediate AAA (authentication, authorization and accounting) elements. It may further include other devices such as routers. The WLAN capable MN comprises all equipment that is in possession of an end user, such as a computer, WLAN radio interface adapter, etc. In I-WLAN a MN attached to the WLAN may either access directly the Internet (referred to as direct IP access) or may connect to its 3GPP operator and use operator's services. Since the operator normally wants to keep control of the MN's traffic, it is usual that the MN accesses the data services over the 3GPP operator, i.e. through the ePDG.

When a mobile node attaches to a WLAN, the MN configures a local IP address ($MN_{LA}$) in the WLAN network. It is further assumed that the MN uses within the WLAN the MIPv6 Protocol which means, that a HA is provided in the WLAN. Then the $MN_L$, is not used for communication with correspondent nodes, rather, this is the address that the MN uses only in the WLAN network, e.g. between the n3G-HA and itself and the $MN_{L4}$ is used by the n3G-HA to forward the data packets to the MN in the WLAN. Hence, the MN uses a non-3GPP Home Address for communication with the ePDG, i.e. an IPsec tunnel between the MN and the ePDG is established by using the configured n3G-HoA.

When the MN establishes the IPsec tunnel (security association, etc.) with the ePDG, the MN receives a remote IP address from the ePDG. Said remote IP address (RA) is used as new CoA of the MN when the MN communicates with the 3G-HA. Afterwards, the MN needs to perform MIP procedures to register the CoA (remote IP address from PDG's network) with its 3G-HA. Only in doing so, the MN can continue using its original Home IP Address, which has been used to start the service in the 3GPP network before handover to the WLAN network.

This connection scenario is illustrated in FIG. 15. Within the WLAN Access Network Mobile IP is used for local mobility, thus there is an IP-in-IP tunnel between the UE and its Home Agent (n3G-HA) in the WLAN Access Network. Furthermore, a secure tunnel is needed to an ePDG, resulting in an IPsec tunnel between the UE and the ePDG. Then, with use of Client Mobile IP for mobility between 3GPP and non-3GPP access, there is another IP-in-IP tunnel between the UE and the PDN-GW (3G-HA), which acts as Home Agent in the 3GPP network. With the IP address allocated by the PDN-GW, an IP packet sent from the UE or received by the UE would result in 4 IP headers on the Wireless Link, which can be appreciated in FIG. 16. In particular, there are three inner headers which amounts to 3×40 bytes=120 bytes of additional headers. Especially in case of e.g. an IMS VoIP service, a huge amount of overhead is added, because the actual voice data payload is usually small.

The amount of bytes in the inner headers may be even higher provided that the IPsec tunnel header also comprises additional security information, as e.g. Encapsulating Security Payload (ESP). Referring to FIG. 16 again, the original data packets are encapsulated within an IPsec header, with the MN's Home Address (n3G-HoA) as the destination address, the ePDG's address as the source address, and including the Encapsulating Security Payload (ESP, 8 bytes in length; not shown) within a corresponding option field. The payload of the new encapsulated packet, i.e. the original data packet, may be encrypted. Furthermore, the ESP provides origin authenticity, integrity and confidentiality of the data packets, while the packet overhead added by the IPsec tunnel sums up to 48 bytes.

A skilled reader will appreciate that all the above presented embodiments of invention are applicable to the scenario as presented in FIG. 16. The principles of the invention may be easily adapted to the specific scenarios. Also, though the following embodiment of the invention is restricted to a 3GPP-WLAN architecture, other access technologies in the MN's network are possible, and the mechanism of the invention may be appropriately applied thereto, as well. For instance, the MN and the CN may both be connected to the same type of network which may be a 3GPP network. Other access technologies that are possible is for example the WIMAX (Worldwide Interoperability for Microwave Access).

In FIG. 17 and FIG. 18 an embodiment of the invention is illustrated in which the n3G-HA performs the header removal, wherein the source address of data packets is used to encode/recognize the data packets on which the header removal is applied. From FIG. 18 the skilled reader will notice that the size of each data packet is reduced by 128 bytes (168 bytes-40 bytes) after performing the embodiment of the invention.

In this example, it is assumed that no changing field(s) are present in the three inner headers that are removed. However, a skilled person is able to implement the principles relating to changing fields, which have been discussed before, in order to cope with changing fields in this scenario of FIG. 16 as well.

It should be noted that performing the different embodiments between the MN and its HA is a mere example for illustration purposes. The invention is however not limited thereto. It is also possible to implement the invention on communication paths between the MN and other network entities, like the ePDG or PDN-GW. In addition, a Header Removal session between two network entities, like e.g. the ePDG and the 3G-HA is feasible as well, as long as both entities comprise the appropriate means to perform the various embodiments of the invention.

A simple high level signaling procedure is described so far in FIGS. 6, 8 and 10 where the signaling is between an UE and an HA. However, it should be mentioned, that a separate protocol for header removal related signaling is not required. The signaling can be also based on existing protocols (e.g. for tunnel setup/modification). One advantage achieved thereby is that the entities do not have to be modified, as corresponding functionality for performing standard procedures (i.e. MIPv6, MOBIKE etc.) is assumed to be comprised in a usual network entity by standard.

One possible protocol that can be enhanced to exchange header removal information is the IKEv2 protocol. Here, the information to perform header removal could be transported for example in a configuration payload field or with an additional notification field in the CREATE_CHILD_SA exchange or in an additional informational exchange.

With header removal the IP addresses of the outer header however change compared to the original tunneled packet, and this might require the establishment of a new IKEv2 session for each tunnel removal session. Therefore, an IKEv2 variant like MOBIKE could be used, because with MOBIKE it is possible to change the IP addresses that are used for an IPsec SA. Furthermore, now the outer header, i.e. the outer header IP addresses, uniquely identify the appropriate contexts for reconstructing the inner headers and also the appropriate Security Association, and thus the Security Parameter Index (SPI) in the ESP header can be additionally omitted. In this case, the Security Association Database (SAD) and the IPsec processing should be changed in the way that the outer header (i.e. the used IP addresses) identify the SA instead of the used SPI.

The creation of an additional child IPsec SA for every header removal flow results also in creation of additional keys for every SA. However, in order to reduce the overhead due to additional keys, it is also possible to share one key among different header removal IPsec SAs.

Because the amount of traffic that would be secured by one shared key when multiple header removal SAs are used for different flows, is not different compared to using the one key to secure all different flows transported in one single non-header removal SA, there should be no additional security risk in sharing the key.

Another possible protocol that can be enhanced to carry the header removal signaling is the Mobile IPv6 protocol. Then, the Header Removal Request can be included in the MIP6 Binding Update (BU) message, probably e.g., as a new Mobility Option and the Header Removal Response can be included in the MIP6 Binding Acknowledge (BACK) message, probably e.g. also as a new Mobility Option. The BU and the BACK inform the other node about the headers that can be removed and about the outer IP header, i.e. at least the used source and destination IP addresses.

Still another way to carry out the header removal signaling, for example if the traffic is IP tunneled between a GW and the UE, is to make use of the application layer signaling (SIP/SDP). Here, during the SIP/SDP (and QoS negotiation) signaling, the used IP addresses, flow label, traffic class, protocols are negotiated. Thus, an additional trigger and possibly a newly allocated IP address included in the SIP signaling could indicate the use of header removal between the Gateway and the UE. The SIP OK message could be extended to inform the UE about the final header parameters. FIG. 19 shows an exemplary signaling flow when SIP/SDP signaling is used.

Before the session is started, the UE may allocate a new IP address that is used for this session. The UE sends an SIP Invite message to the SIP proxy (P-CSCF) with an additional flag, indicating that header removal should be applied and probably the new IP address that should be used for tunneling this flow. Accordingly, the P-CSCF detects that header removal should be used. The information about the inner IP header fields can be derived from the SDP messages.

The normal SIP exchange between the UEs is performed but without the additional header removal indication. The P-CSCF informs the Policy and Charging Rules Function (PCRF) about the header removal request and the to be used IP address. The PCRF in turn may authorize the request and informs the Gateway about the header removal, i.e. the inner headers that should be removed and the new IP address of the UE. The GW may at that time also allocate a new IP address for the session.

The GW sends the Header Removal Accept to the PCRF and informs it about the Downlink HR Context ID, i.e. the allocated IP address. The PCRF subsequently informs the P-CSCF about the Downlink HR Context ID. Finally, the P-CSCF sends the SIP OK message to the UE, including the Header Removal Accept message and the Downlink HR Context ID.

It should be noted that the above implementation of the signaling into the SIP procedure, is only exemplary, and shall not be understood as restricting. Rather, a skilled person will be easily aware of variations that may be applied.

A currently discussed topic in the IETF MEXT Working Group is the implementation of a "Generic Notification Message". This generic message might be used to perform the "header removal request/response" signaling as exemplified in FIG. 19, instead of using SIP signaling and other means.

Another possibility in said respect, would be to us new Mobility header types. In said case, messages, normally being part of Mobile IP, would then be used for the "header removal request/response" signaling, by employing a different header indicating said type.

According to another embodiment of the invention, it might not be necessary to reconstruct all of the inner headers, depending on the UE and on the applications on the UE. It could be sufficient to reconstruct only the most inner header that is needed by the higher layer. Referring to FIG. 15, if there are for example multiple tunnels to/from the UE (e.g. one IP tunnel to n3G-HA, one IPsec tunnel to ePDG and another IP tunnel to PDN GW), then, the IP header of the original IP flow (between the UE and a correspondent host) without tunnelling and the header of the UE-PDNGW tunnel and also the header of the UE-ePDG tunnel can be removed with the header removal. Thus, the traffic between UE and n3G-HA for this specific session has only one IP header that has for downlink traffic a UE IP address as destination address and an n3G-HA IP address as source address. In this case, when the UE is tunnel endpoint of both tunnels, there is no need to reconstruct the UE-ePDG tunnel or the UE-PDN-GW IP tunnel. For the higher layers it might be sufficient to reconstruct only the IP header used for the UE-CN session.

Additionally, depending on the application, it could be possible that even the most inner header needs not to be reconstructed, then the data payload can be passed to the application directly.

The Header Removal according to one of the above embodiments of the invention allows the removal of several inner headers simultaneously. For example, in the scenario shown in FIG. 17, the HA in the WLAN can remove the headers of the UE-ePDG tunnel, of the UE-PDN-GW tunnel and of the UE-CN IP session.

However, a tunnel can be e.g. encrypted and then the inner headers are not visible and it is not possible to remove them. In this case and if header removal is supported by multiple endpoints, the header removal can be also applied in a sequential manner achieving the same amount of overhead reduction on a particular communication path, like between the MN and its HA in the WLAN. According to this embodiment, the UE performs the header removal procedure with each tunnel endpoint separately.

For instance, there could be a secure tunnel between UE and ePDG and between UE and PDN GW. Then, it would not be possible for the HA in the WLAN to remove the UE-PDN-GW header or the UE-CN header, and it would also not be possible for the ePDG to remove the UE-CN header. With the sequential header removal according to this embodiment of the invention, it is still possible to achieve the header removal between the HA and the MN, as will be discussed below.

The UE may perform the procedure in the following way; at first UE performs header removal with the PDN-GW to remove the header of the UE-CN IP session. Subsequently, the UE performs header removal with the ePDG to remove the header of the UE-PDN-GW session that was created in the previous step to remove the UE-CN header. The UE performs header removal with the HA in the WLAN to remove the header of the UE-ePDG session that was created in the previous step to remove the UE-PDN-GW header.

The resulting flow is shown in FIG. 20. The flows from the CN to the PDN-GW have not changed and have one IP header. In the flows from the PDN-GW to the ePDG the inner UE-CN header is removed, and a separate flow for each inner header is established. The same is done on the ePDG and on the HA, the inner header is removed and a separate flow is established. On each communication path between the various entities only one header is present in the exchanged data packets.

IPv4 is still widely used in the Internet. In the previous embodiments it has been assumed that the outer header, after having performed header removal according to one of the embodiments, belongs to the IPv6 type. Then, in case of the outer IPv6 header and in case the UE has an IPv4 session with a CN, i.e. an inner IPv4 header, where both entities have an IPv4 address, the concatenation of the IPv4 addresses of the UE and the CN may be used as Context-ID, i.e. as interface identifiers of an address of the outer IPv6 header. Naturally, other combinations of the IPv4 addresses of the UE and the CN are also possible, apart from a simple concatenation of same to form the interface identifier.

Another optimization, in case the inner header is of the IPv4 type and the outer header is of an IPv6 type and alternatively to encoding the inner header fields to different source/destination addresses, as discussed in detail in previous embodiments, the inner IPv4 fields may be copied into the outer IPv6 header by the following rule:

| Inner IPv4 Header | Outer IPv6 Header |
|---|---|
| Type Of Service | Traffic Class |
| Total Length | Payload Length |
| Identification | Flow Label |
| Flags | Encoded into Interface Identifier |
| Fragment Offset | Encoded into Interface Identifier |
| Time To Live | Hop Limit |
| Protocol | Next Header |

As already mentioned, in the various embodiments of the invention described above it is assumed that the header removal of tunnelled data packets is applied when the outer header is an IPv6 header, as displayed in FIG. 4. This is for example the case when the UE is in an access network supporting IPv6 only, thus using an IPv6 header as the outer header. However, the invention is not limited to only IPv6 header types; there are at least two additional scenarios possible.

According to a first scenario, it cannot be always assumed that IPv6 is supported, i.e. some access networks might support IPv4 only. Then, the UE can only allocate an IPv4 address, and in case of tunnelling (e.g. DSMIP or IPSec), the outer header would be an IPv4 header, even when the inner packets are IPv6 packets.

According to a second scenario, the access network in which the mobile node is located might support both IP versions, IPv4 and IPv6. In said case, the UE might choose between both. However, e.g. in case of DSMIPv6, it is advantageous that the MN should prioritize IPv6 care-of addresses.

One of the problems with the first scenario is that header removal as described thoroughly in the previous embodiments of the invention above assuming an outer IPv6 header, does not work with IPv4. One of the problems with the second scenario is that IPv6 headers are 40 bytes long, whereas IPv4 headers are only 20 bytes (and 28 bytes with additional UDP header). Thus, the chosen IPv6 header would be nearly 2-times (1.43-times) the size of an IPv4 header.

According to another embodiment of the invention, instead of using an outer IPv6 header, the outer header is always changed to the IPv4 type, when possible. More specifically, in case the access network of the mobile node and the PDN-GW supports IPv4, when performing the header removal, the inner IPv6 headers are removed, and an outer IPv4 header is applied to the data packet. An exemplary header of the IPv4 type is illustrated in FIG. 21.

The main benefit is that the tunnel removal mechanism is also made possible for IPv4 only access networks. Furthermore, in the case IPv4 as well as IPv6 are supported, the header removal mechanism using IPv4 outer headers results in even smaller data packets than when using the header removal with the IPv6 outer header. Even more, the resulting data packet after header removal is even smaller than the initial data packet transmitted from the CN, using the IPv6 header.

These two benefits are illustrated in more detail using FIG. 22, which generally corresponds to FIG. 5 of the previous embodiments. When comparing FIG. 5 and FIG. 22, it is apparent that the IPv6 data packet header exchanged between the HA and the MN is twice as large as the IPv4 one of FIG. 22. Furthermore, within FIG. 22, the data packet exchanged between the CN and the HA, and the one exchanged between the HA and the MN, are also different in size. This is due to the different header sizes of IPv4 and IPv6.

As already addressed in previous embodiments of the invention, there may be changing fields in the inner headers that shall be removed (i.e. Traffic Class, Flow Label or Hop Limit). Since the values within said fields may change from one data packet to another data packet, they need to be addressed separately and for each value of the changing field. This problem may be overcome by simply not removing the corresponding fields with the changing values. Thus, only static fields would be removed according to the inventive header removal procedure explained in the various different embodiments before.

Another possibility to handle changing fields in the inner headers is to copy the content of the changing fields to the final outer header. But the copying of the changing fields of the inner IPv6 headers and the outer IPv4 header poses a problem in that the IPv4 and the IPv6 header fields are different.

However, even though the header fields are different, one possible exemplary copying method of inner IPv6 headers to outer IPv4 headers is shown in the following table:

| Inner IPv6 Header | Outer IPv4 Header |
|---|---|
| Traffic Class | Type Of Service |
| Flow Label | Identification + Fragment Offset |
| Hop Limit | Time To Live |

This mapping of the inner IPv6 fields to the outer IPv4 fields is only possible if the outer IPv4 fields are not used. Especially for the copying of the Flow Label field, the IPv6 packet needs to be not fragmented. Otherwise, the IPv4 Identification field is bound to carry the Identification of a removed inner IPv6 fragmentation header. If the Identification field and Fragment Offset field are used to carry an inner Flow Label field, the more fragments flag should be set to 0. In case the outer header fields are already in use (e.g. the Identification field), the corresponding field of the inner header (e.g. Flow Label) should be maintained within the inner header. One possibility here (as always) is to not remove the inner IPv6 Fragment Header in this case.

Another possibility to overcome the cases where the outer header fields cannot encode changing inner IPv6 header fields (e.g. Hop Limit) is to use different IPv4 source and/or destination addresses. This is similar to the embodiments discussed in connection with FIGS. 11, 12 and 13. This is again illustrated in FIGS. 23 and 24, where different IPv6 Hop Limits are encoded into different outer IPv4 destination addresses.

Nevertheless, apart from the limitations with regard to the outer header fields described above, IPv4 has further limitations compared to IPv6. At first, IPv4 does not support stateless address autoconfiguration, i.e. the UE cannot configure an address based on a prefix and a generated interface identifier. Further, IPv4 may suffer from limited address space. The UE may not be able to allocate any number of IPv4 addresses, but only a very limited number, or only a single one in the worst case. Another problem could be that private IPv4 addresses in connection with Network Address Translation (NAT) are widely used. Put briefly, the UE gets assigned a private IPv4 address in the access network, and then, in the communication with external nodes the private IP address is translated by a NAT router into a public IP address. In these cases the encoding of a Context-ID into outer IPv4 headers is not possible.

More specifically, as already known to the skilled person, IPv4 has only a comparatively small address space. Network Address Translation deals with the IPv4 address shortage by transceiving network traffic through a corresponding NAT router that involves re-writing the source and/or destination IP addresses and usually also the TCP/UDP port numbers of IP packets as they pass through.

In a typical configuration, a local network uses one of the designated "private" IP address subnets, and nodes in said subnet have corresponding private addresses. Further, a NAT router on that network has also a private address in that address space and is connected to the Internet with a single "public" address (known as "overloaded" NAT) or multiple "public" addresses assigned by e.g. an Internet Service Provider. As traffic passes from the local network to the Internet, the source address in each packet is translated on the fly from the private addresses of the nodes to the public address(es).

The router tracks basic data about each active connection (particularly the destination address and port). When a reply returns to the router, it uses the connection tracking data, stored during the outbound phase, to determine where on the internal network to forward the reply; the TCP or UDP client port numbers are used to demultiplex the packets in the case of overloaded NAT, or IP address and port number when multiple public addresses are available, on packet return. To a system on the Internet, the router itself appears to be the source/destination for this traffic.

In other words, different kinds of NATs are possible, such as basic Network Address Translation (Basic NAT) or Network Address Port Translation (NAPT). With Basic NAT there is a one-to-one mapping between the private and public IP addresses. Alternatively, NATs may be overloaded; then, the public IPv4 address is used by several hosts behind the NAT. In order to traverse these overloaded NATs, NAPT is used. In this case TCP or UDP port numbers are used to identify the connection, respectively the host behind the NAT. For example, UDP tunnelling is used in case of DSMIPv6 (Dual Stack MIPv6) in an IPv4 access network, i.e. packets between the MN and HA are tunneled by UDP and IPv4.

According to another embodiment of the invention, when using IPv4 with UDP tunneling for exchanging data packets, instead of allocating new source and destination IP addresses, the UDP header (e.g. for traversing NATs) can be re-used for header removal. For instance, an UDP port number may be newly configured to be the Context-ID for later on reconstructing the inner headers that have been removed by the communication peer entity. This might be done instead of using IP address as Context-IDs or in combination therewith.

In addition, to handle the fields having changing values, it is possible to configure one special UDP port number for each different value in said changing field. This is illustrated in FIGS. 25 and 26, respectively showing data packets before and after the header removal. The UDP port number in FIG. 25 is used as Context-ID and belongs to the Hop Limit=X. Consequently, data packets with different Hop Limits than X would have a different UDP port number as Context-ID, such as Hop Limit Y, which belongs to the Context-ID "port nr.y", as illustrated in FIG. 26. FIG. 27 shows the data packet formats used during the communication between a MN and a CN, confronting the data packet formats on the communication path between the HA and the MN, before and after applying the header removal according to the current embodiment of the invention discussed in connection with FIG. 26.

The configuration of the header removal procedure may be the same as for the previous embodiments. Further, provided that the header removal should be applied between a UE and a PDN-GW (the HA of the UE), then, in the header removal signaling flow, the UE indicates in a Header Removal Request message to the PDN-GW the inner headers to be removed and the desired behavior regarding possible changing fields. If the UE is not able to allocate additional IP addresses for different flows with removed header, it indicates different UDP ports to be used for the different flows.

In the example in FIG. 28 it is shown how data packets would look like in case a UE communicates with 2 CNs from a private IPv4 access network through a NAT and header removal is used between the UE and the PDN-GW. CN1 and CN2 are sending data packets with IPv6 headers to the UE's Home Address, i.e. allocated at the PDN-GW. The PDN-GW uses DSMIPv6 with IPv4 and UDP tunneling to tunnel the packets to the UE. In addition, according to the present embodiment of the invention the PDN-GW removes the IPv6 header and uses different UDP destination ports for the packets from the different CNs. At the NAT the public IPv4 addresses are changed to the private IPv4 address of the UE and the port numbers may be also changed to numbers assigned by the NAT. In this case, the PDN-GW knows to perform the header removal according to the present embodiment when it detects the destination ports 4444 (for packets from CN1) or 4445 (for packets from CN2). The corresponding Context-IDs for the UE however are 23456 and 23457 respectively, due to the change of UDP port number at the NAT router. Consequently, when the UE detects the UDP port numbers 23456 and 23457, it may identify the reconstruction context with which to respectively reconstruct the complete header concatenation.

One issue to be considered when the UE is behind a NAT is that Address-Dependent or Address and Port-Dependent Filtering may be applied in the NAT. In this case, if the port number of the internal endpoint or of the external endpoint changes, packets are dropped at the NAT. I.e. in the example above, if the PDN-GW sends packets to the UE and uses a port number (source and/or destination, depends on the configuration of the NAT) that was not used during previous communication, the packets will be dropped by the NAT, instead of being forwarded. To overcome this, the UE must first send packets to the external node's IP address and port from the appropriate internal IP address and port. This would enable the NAT router to receive and forward incoming packets to the UE.

Furthermore, this also means in case changing fields are encoded in the UDP port sent from the PDN-GW, the PDN-GW must first trigger the UE over an existing connection to send a packet to the PDN-GW address and the appropriate port. This has to be done every time a new value of the changing field needs to be considered for the inventive header removal.

Another issue is that the NAT may change the port number of the UDP header: For example, if different hosts behind the NAT are communicating with the same external node and are using internally the same port number. Then, it may not be sufficient if the UE informs the PDN-GW about the to be used destination port, because the destination port number seen by the PDN-GW may be different from the one used by the UE, as already shown with FIG. 28. Matter of fact, when more than one host uses internally the same port number, the NAT, using only one public IP address, needs to change said port number into two different port numbers so as to distinguish data packets incoming for said two hosts.

Therefore, one embodiment of the invention suggests that the UE should send the Header Removal Request message from the UDP source port that should be used for the appropriate uplink and downlink session. In other words, a Context configuration message for exchanging the Context-ID, possibly including further information such as reconstruction information, is sent from the UE to the PDN-GW using the Context-ID (port number) as source port number of said message. Then, when the NAT changes the UDP port number, the configuration message received in the PDN-GW has a different source port number than the one specified as the Context-ID (port number) within the actual message. Thus, the PDN-GW may determine that the source port number of the message is to be used as Context-ID instead of the one indicated in the actual message.

FIG. 29 shows a similar arrangement as FIG. 28, however with only one CN but illustrating the data packet exchange in both directions. It is assumed that a NAT router is located between the UE and its HA, the PDN-GW. For this exemplary embodiment of the invention illustrated, it is also assumed that the Context-ID is encoded into the port number of the data packets.

In the downlink, i.e. from the CN to the UE, the Context-ID is the UDP destination port, and more specifically, UDP port 4444 for the PDN-GW and UDP port 23456 for the UE. When the PDN-GW detects that a data packet is to be transmitted to UDP port 4444 it performs header removal according to one of the previous embodiments, and thus only maintains one outer header, here, an IPv4 header, and the UDP header. Said smaller data packet is then transmitted to the NAT, which changes the destination field of the data packet by using the UE's private address and a different UDP port number. The UE receives the data packet and may recognize from the UDP port number 23456 that header removal was applied thereto, and may then reconstruct the complete concatenation of headers using the Context identified by the Context-ID.

When being compared to the data packet format and content without applying the header removal, it stands out that the UDP port number used in the destination field of the UDP header is different, namely 3333 between HA and NAT router or 5987 between the NAT router and the MN.

Conversely, on the uplink the source UDP port number is used as Context-ID. In more detail, source UDP port number 23456 triggers the UE to perform header removal on an outgoing data packet. Source UDP port number 4444 induces the PDN-GW to perform header reconstruction using context information identified by the Context-ID 4444.

Referring now to a different embodiment of the invention, one possible scenario is that a DSMIPv6 UE is at first connected to a trusted access, i.e. the PDN-GW is reachable from the access network, and the UE can send a Binding Update directly to the PDN-GW. In addition, the UE may have established a header removal context in the PDN-GW. Then, the UE is doing a handover to an untrusted access and allocates a local IPv6 prefix and has a corresponding local IPv6 address. Further, because the PDN-GW is not directly reachable from the access network, the UE needs to establish a connection with an ePDG before being able to send a BU to the PDN-GW. The connection with the ePDG may further include a further encapsulation of the data packets. FIG. 30 illustrates the packet format and contents when the MN is located in an untrusted network and needs to communicate via an ePDG with the PDN-GW and the CN.

In the data packets denoted with "before", it is apparent that between the ePDG and the MN a total of three IP headers is present in each data packet. In more detail, the most inner header refers to the one used by the CN to transmit and direct the data packet. The second inner header is attached by the HA according to MIP and may belong to Version 6 or Version 4 of the Internet Protocol, here IPv4. The ePDG then encapsulates said packet in a further header and attaches the ESP header of the IPsec protocol for security reasons. Consequently, the packet received in the UE has three IP headers and the ESP header.

By performing the header removal according to previous embodiments between the HA and the UE, it is possible to remove the IPv6 header used by the CN, as apparent by the data packet illustrated in FIG. 30 between the HA and the ePDG, denoted "after".

By performing a further header removal between the ePDG and the UE it is even possible to remove the outer header, used by the HA after the header removal to transmit the data packet, thus only maintaining one header and optionally the ESP header.

The exemplary Context-IDs would be the following in the downlink:

The HA detects the source address 115.1.1.7 of a data packet and in response thereto performs header removal. The ePDG detects that the destination address 110.10.0.7 would be used for a data packet and also performs header removal according to one of the previous embodiments. Then, the MN receiving the data packet notes the Context-ID 110.10.0.7 in the destination address field, and performs header reconstructions as configured with the ePDG, thereby arriving at a data packet with the header structure as employed between the HA and ePDG after the header removal by the HA.

Subsequently, the MN would notice the Context-ID 115.1.1.7 in the source address field of the outer header of the data packet, and performs header reconstruction as configured with the HA, thereby arriving at a data packet with the complete concatenation of headers as illustrated by the data packet format denoted "before".

One possible alternative optimization in this scenario to reduce the signaling overhead during handover, is that the UE, during tunnel establishment to the ePDG, signals to the ePDG that it wants to use header removal. At the same time, it requests an address prefix from the ePDG and then sends a BU to the PDN-GW with the new CoA prefix. Additionally, the UE tells the ePDG that it should not encapsulate and tunnel packets from the PDNGW to the UE, but instead the ePDG shall substitute the source address prefix of the outer header of the downlink packets from the PDN-GW with a new prefix from the ePDG and substitute the destination address prefix by the local address prefix. Consequently, it would not be necessary to establish a further header removal with the ePDG (see FIG. 30), but it would suffice to avoid the additional tunnel by changing the outer header as indicated while maintaining the ESP header and thus the security between the ePDG and the MN.

Another optimization to reduce signaling overhead, e.g. to simplify the clean up of the ContextIDs when leaving a PDN-GW, is, to have hierarchy in the structure of the context ID. For example the context ID can be split into 3 parts:

1. PDN-GW Context-ID referring to a PON-GW,
2. Session Context-ID referring to a session, e.g. consisting of several flows (audio+video), and
3. Flow Context-ID referring to a flow in a session.

For instance, when using a port number as Context-ID, e.g. 23456, the number "23" would denote the entity with which the header removal session would be established, in this case the PDN-GW. The number "4" might indicate the session, and the remaining number "56" could distinguish the different flows.

Therefore, when the UE wants to terminate all sessions/flows from one PDN-GW, it only indicates the PDN-GW Context-ID and all header removal contexts can be deleted. On the other hand, if the UE wants to terminate all flows of a session, it only indicates the Session Context-ID and all header removal contexts (i.e. all flows) belonging to the session can be terminated in one step.

Moreover, a UE may have created a header removal context for the tunnel between the UE and e.g. a PDN-GW for a session to a CN. However, if the UE is for example in an untrusted non-3GPP access network, the UE may have additionally created a header removal context for the tunnel between the UE and an ePDG for the same session (see FIG. 30 and corresponding discussion). Then, there are multiple Context-IDs in the UE for the same session. In this scenario the context with the PDN-GW can be put into a dormant mode, if it is not necessary to reduce resources within the network. The context with the ePDG may be setup and only this one would then be used. On the other hand, if also header removal within the network should be used, then there are two contexts for one packet. One possible enhancement here is to use the hierarchical three-part context described above and to inform the ePDG about the PDN-GW Context-ID and then the ePDG may re-use the other parts of the Context-ID and only changes the PDNGW Context-ID to its own ePDG Context-ID.

As will be apparent to a skilled person, the above discussed embodiments of the invention are mere examples of how to implement the concepts behind the invention. Various combinations of the previous embodiments are possible and may depend on the actual requirements of the implementation. For instance, the use of UDP port numbers as Context-ID may be combined with the use of IP address as Context-IDs, e.g. one for uplink, the other for downlink; or even a combination of port number and IP address as one Context-ID. A further exemplary combination would be the use of the hierarchically structured Context-ID for IP addresses, be it IPv4 or IPv6.

Apparently, the principles of the invention are very flexible and may be adapted to the particular scenario for achieving the greatest benefit therefrom.

A data packet may be identified as a data packet on which header removal has been performed only by the two peer entities participating in the header removal procedure, for example the UE and the PDN-GW, when looking for the Context-ID in the data packet. In other words, from outside it is not possible to determine whether the current data packet is a data packet with header removal or not. However, for some functions it might be advantageous to distinguish a "normal" data packet from a data packet on which header removal has been or will be performed. For instance, charging in the network may be performed based on the size of the payload. The payload part of packets with header removal is larger compared to packets without header removal. Therefore, the packets should be charged differently and the charging function in the network should be able to distinguish the packets.

For DSMIPv6 there is a possibility that a TLV header comes after the UDP header in a data packet. This TLV header might be used to indicate that the data packet is of the type "IP with removed header". Then, the payload following said TLV header would be the actual data packet with the removed (parts of) inner headers.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technological Background section. Furthermore the concept of the invention may be also readily used in the LTE RAN currently discussed by the 3GGP.

The invention claimed is:

1. A method for reducing a size of data packets of a data flow exchanged on a communication path in a mobile communications system between a first entity and a second entity, wherein the data packets on said communication path comprise a concatenation of headers, wherein an outer header in the concatenation of headers is used for exchanging the data packets on the communication path between the first and second entity, wherein the method comprises the steps of:
   configuring a new address uniquely identifying a context comprising information for reconstructing the concatenation of headers in the data packets,
   replacing an address in a destination or source address field of the outer header with the configured new address,
   removing at least one part of at least one header other than the outer header from the concatenation of headers, prior to transmitting the data to the second entity, and
   transmitting the data packets with the concatenation of headers from which the at least one part of the at least one header has been removed from the first entity to the second entity via the communication path using the outer header with the configured new address in the destination or source address field.

2. The method according to claim 1, wherein the configured new address in the destination or source address field of the data packets is used to exchange the data packets between the first and second entity and to enable reconstruction of the concatenation of headers.

3. The method according to claim 1 further comprising the step of:
   exchanging between the first and second entity the context comprising information for reconstructing the concatenation of headers, and upon configuring the new address, associating the configured new address with the context comprising information for reconstructing the concatenation of headers.

4. The method according to claim 1, further comprising the steps of:

deciding in the first or second entity for a downlink and/or uplink direction which at least one part of the at least one header in the concatenation of headers except for the outer header is to be removed from the data packets and reconstructed, and upon performing the deciding, informing the second or first entity about which at least one part of the at least one header in the concatenation of headers is to be removed and reconstructed.

5. The method according to claim 1, wherein the first entity configures the new address, wherein the step of replacing replaces an address in the source address field of the outer header of the data packets transmitted from the first entity to the second entity, and an address in the destination address field of the outer header of the data packets transmitted from the second entity to the first entity, with the configured new address of the first entity, or wherein the first entity and the second entity each configure one new address, and the step of replacing replaces the source or destination address field in the outer header of the data packets transmitted from the first entity to the second entity with the configured new address of the first or second entity, and replaces the source or destination address field in the outer header of the data packets transmitted from the second entity to the first entity with the configured new address of the second or first entity.

6. The method according to claim 1, wherein the outer header of the data packets includes an original address composed of a prefix and an interface identifier, and the step of configuring the new address configures the new address by maintaining the prefix of the original address and changing the interface identifier, or by changing the prefix and the interface identifier.

7. The method according to claim 1, wherein within the data flow the at least one part of the at least one header that is to be removed from the concatenation of headers in the data packets comprises a field with a value that can vary from one data packet to another data packet, the method further comprising the step of:

copying the varying value from the at least one part of the at least one header that is to be removed into a field in the outer header corresponding to the field with the varying value in the at least one part of the at least one header.

8. The method according to claim 1, wherein within the data flow the at least one part of the at least one header that is to be removed from the concatenation of headers in the data packets comprises a field with a value that can vary from one data packet to another data packet, the method further comprising the steps of:

determining from the one data packet to the another data packet a rate of variation of the value in the field of the at least one part of the at least one header that is to be removed, wherein the steps for reducing the size of the data packet according to claim 1 are performed based on whether the rate of variation of the value is below a predetermined value.

9. The method according to claim 1, wherein within the data flow the at least one part of the at least one header that is to be removed from the concatenation of headers in the data packets comprises a field with a value that can vary from one data packet to another data packet, and wherein for each different value among the varying values of said field, a different new address is configured, each of which uniquely identifies a different context comprising information for reconstructing the concatenation of headers comprising the different value.

10. The method according to claim 1, wherein within the data flow the at least one part of the at least one header that is to be removed from the concatenation of headers in the data packets comprises a field with a value that can vary from one data packet to another data packet, and wherein the first entity and the second entity each configure a new address, and the step of replacing replaces an address in the source or destination address field of the outer header with the configured new address of the first entity, and replaces an address in the destination or source address field of the outer header with the configured new address of the second entity, wherein the configured new address of the first or second entity uniquely identifies a context for reconstructing the field with the varying value and the configured new address of the second or first entity uniquely identifies a context for reconstructing the concatenation of headers except for the field comprising the varying value.

11. The method according to claim 1 further comprising the steps of:

generating at the first entity a first hash value which represents the at least one part of the at least one header to be removed from the concatenation of headers by performing a specific calculation on fields of the at least one part of the at least one header, transmitting a message from the first entity to the second entity comprising the generated first hash value, the configured new address and information on the fields of the at least one part of the at least one header on which the calculation of the first hash value is performed, generating at the second entity a second hash value by performing on each received data packet the specific calculation on the fields of the at least one part of the at least one header, indicated by the information, identifying at the second entity the concatenation of headers of received data packets, that are to be reconstructed and/or from which the at least one part of the at least one header has to be removed, by matching the first hash value with the second hash value of each received data packet, and associating at the second entity the configured new address of the first entity with a context for reconstructing the identified concatenation of headers.

12. The method according to claim 1, further comprising the steps of:

generating at the first entity a first hash value which represents the at least one part of the at least one header to be removed from the concatenation of headers, by performing a specific calculation on fields of the at least one part of the at least one header, transmitting a message from the first entity to the second entity comprising the generated first hash value and information on the fields of the at least one part of the at least one header on which the calculation of the first hash value is performed, generating at the second entity a second hash value by performing on each received data packet the specific calculation on the fields of the at least one part of the at least one header, indicated by the information, identifying at the second entity the concatenation of headers of received data packets, that are to be reconstructed and/or from which the at least one part of the at least one header has to be removed, by matching the first hash value with the second hash value of each received data packet, deducing in the second entity the new address of the first entity by maintaining a subnet prefix compared to an original address of the first entity and using the first hash value as an interface identifier of the new address of the first entity, and associating at the second entity the deduced new address of the first entity with a context for reconstructing the identified concatenation of headers.

13. The method according to claim 1, wherein the first entity is located in a first network and moves to a second network, and the method further comprises the step of:

upon moving to the second network, configuring by the first entity another new address, which uniquely identifies the context comprising information for reconstructing the concatenation of headers, and informing the second entity about the another new address, being used instead of the configured new address for uniquely identifying the context comprising information for reconstructing the concatenation of headers.

14. The method according to claim 1, wherein the first entity is located in a first network and moves to a second network, and the method further comprises the step of:

upon moving to the second network, configuring by the first entity another new address, which uniquely identifies the context comprising information for reconstructing the concatenation of headers, and informing the second entity about the another new address, being used instead of the configured new address for uniquely identifying the context comprising information for reconstructing the concatenation of headers, wherein the first entity concurrently performs the method to reduce the size of data packets according to claim 1 with the second entity a plurality of times, wherein the first entity respectively holds a configured new address for the each of the plurality of times the method is performed with the second entity, and wherein the step of informing comprises transmitting from the first entity a bulk message to the second entity, comprising the plurality of configured new addresses of the first entity and information on the corresponding contexts in the second entity, which are to be uniquely identified by each of the plurality of the configured new addresses of the first entity.

15. The method according to claim 1, wherein the outer header belongs to the Internet Protocol Version 6, and wherein within the data flow the at least one part of the at least one header, belonging to the Internet Protocol Version 4 and to be removed from the concatenation of headers in the data packets, comprises a field with a value that can vary from one data packet to another data packet, and the method further comprises the step of:

copying the varying value of the field from the inner header to an appropriate field of the outer header.

16. A method for generating data packets comprising a complete concatenation of headers from received data packets comprising an incomplete concatenation of headers, wherein the data packets belong to a data flow exchanged on a communication path in a mobile communications system between a first entity and a second entity, and the method comprises the steps of:

receiving a data packet comprising an incomplete concatenation of headers and at least an outer header, having been used for the exchange of the data packet on the communication path between the first entity and the second entity, the outer header comprising an address uniquely identifying a context comprising information for reconstructing the complete concatenation of headers, and reconstructing at least one part of at least one header other than the outer header to generate the complete concatenation of headers for the received data packet based on the information in the context uniquely identified by the address in the outer header of the received data packet.

17. The method of claim 16, further comprising the steps of:

determining at the second entity whether to reconstruct the complete concatenation of headers, in case it is determined to not reconstruct the complete concatenation of headers, determining which part of the complete concatenation of headers is to be reconstructed, and reconstructing the determined part of the complete concatenation of headers based on the information in the context identified by the address in the outer header of the received data packet.

18. A method for reducing a size of data packets of a data flow exchanged between a first entity and second entity, wherein the data packets of said data flow comprise a concatenation of headers, including an outer header and a first inner header used for exchanging the data packets between the first and second entity, wherein the first and second entities are located in networks supporting the Internet Protocol Version 4, and the method comprises the steps of:

configuring the outer header of a data packet to the Internet Protocol Version 4 type, configuring a new port number, and uniquely identifying a context comprising information for reconstructing the concatenation of headers in the data packet, replacing a port number in a destination or source field of the first inner header of the concatenation of headers with the configured new port number, removing at least one part of at least one header, other than the outer header and the first inner header, from the concatenation of headers, prior to transmitting the data packet to the second entity, and transmitting the data packet with the concatenation of headers, from which the at least one part of the at least one header has been removed, from the first entity to the second entity using the outer header and the first inner header with the configured new port number, wherein within the data flow the at least one part of the at least one header that is to be removed from the concatenation of headers in the data packet comprises a field with a value that can vary from one data packet to another data packet, and wherein a new port number is configured for each varying value of the field, respectively uniquely identifying a context comprising information for reconstructing the concatenation of headers in the data packet including the varying value in the field.

* * * * *